United States Patent
Kobori et al.

(10) Patent No.: US 10,525,392 B2
(45) Date of Patent: Jan. 7, 2020

(54) FILTRATION MATERIAL, FILTER ELEMENT USING SAME, AND MANUFACTURING METHOD OF FILTRATION MATERIAL

(71) Applicant: Japan Vilene Company, Ltd., Tokyo (JP)

(72) Inventors: Satoru Kobori, Ibaraki (JP); Naoki Matsuda, Ibaraki (JP); Takashi Nishitani, Ibaraki (JP)

(73) Assignee: JAPAN VILENE COMPANY, LTD., Tokyo (JP)

( * ) Notice: Subject to any disclaimer, the term of this patent is extended or adjusted under 35 U.S.C. 154(b) by 162 days.

(21) Appl. No.: 15/329,294

(22) PCT Filed: Jul. 22, 2015

(86) PCT No.: PCT/JP2015/070769
§ 371 (c)(1),
(2) Date: Jan. 26, 2017

(87) PCT Pub. No.: WO2016/017484
PCT Pub. Date: Feb. 4, 2016

(65) Prior Publication Data
US 2017/0216750 A1 Aug. 3, 2017

(30) Foreign Application Priority Data

Jul. 30, 2014 (JP) .................................. 2014-154668
Aug. 28, 2014 (JP) .................................. 2014-174449

(51) Int. Cl.
*B01D 53/22* (2006.01)
*B01D 46/00* (2006.01)
(Continued)

(52) U.S. Cl.
CPC ......... *B01D 46/0032* (2013.01); *B01D 39/14* (2013.01); *B01D 39/163* (2013.01);
(Continued)

(58) Field of Classification Search
CPC ........ B01D 39/1623; B01D 2239/0233; B01D 46/10; B01D 2239/0435; B01D 39/1615;
(Continued)

(56) References Cited

U.S. PATENT DOCUMENTS 3,307,332 A * 3/1967 Grace ................ B01D 39/1623
55/481
4,323,374 A * 4/1982 Shinagawa ........ B01D 46/0032
55/486

(Continued)

FOREIGN PATENT DOCUMENTS

| CN | 1490068 A | 4/2004 |
| CN | 1767882 A | 5/2006 |

(Continued)

OTHER PUBLICATIONS

Machine translation of Muramoto JP 2014-004555 dated Jan. 16, 2014, 13 pages (Year: 2014).*

(Continued)

*Primary Examiner* — Anthony R Shumate
(74) *Attorney, Agent, or Firm* — Heslin Rothenberg Farley & Mesiti P.C.

(57) ABSTRACT

A filtration material of the present invention comprises a bulky fiber sheet layer having a thickness of 0.5 mm or more, and a triboelectrically-charged nonwoven fabric layer in which two or more types of fibers different in constituent resin are mixed, wherein constituent fibers of the triboelectrically-charged nonwoven fabric layer penetrate into the bulky fiber sheet layer. A three-layer filtration material of the present invention comprises bulky fiber sheet layers having (Continued)

a thickness of 0.5 mm or more, and a triboelectrically-charged nonwoven fabric layer, which is located between the bulky fiber sheet layers, wherein the constituent fibers of the triboelectrically-charged nonwoven fabric layer penetrate into the bulky fiber sheet layers, and both bulky fiber sheet layers contain fibers having a limiting oxygen index of 20 or more, and have a mass per unit area 0.5 times or more than that of the triboelectrically-charged nonwoven fabric layer. A filter element of the present invention comprises the filtration material in a pleated state.

10 Claims, 2 Drawing Sheets

(51) Int. Cl.
B01D 46/10 (2006.01)
B01D 39/14 (2006.01)
B01D 39/16 (2006.01)
B01D 39/20 (2006.01)
B01D 46/52 (2006.01)
B03C 3/30 (2006.01)

(52) U.S. Cl.
CPC ..... *B01D 39/1615* (2013.01); *B01D 39/2024* (2013.01); *B01D 46/10* (2013.01); *B01D 46/521* (2013.01); *B03C 3/30* (2013.01)

(58) Field of Classification Search
CPC .. B01D 46/0032; B01D 46/521; B01D 46/52; B01D 39/14; B01D 39/2017; B01D 2239/0457; B01D 39/2024; B01D 2239/1233; B01D 2239/0659; B01D 39/163; B03C 3/47; B03C 3/28; B03C 3/30
See application file for complete search history.

(56) References Cited

U.S. PATENT DOCUMENTS

| | | | |
|---|---|---|---|
| 5,051,159 A * | 9/1991 | Togashi | B01D 39/10 204/165 |
| 5,780,153 A * | 7/1998 | Chou | B01D 39/163 428/359 |
| 5,874,373 A * | 2/1999 | Pryne | B32B 5/26 442/388 |
| 2002/0121194 A1* | 9/2002 | Buchwald | B01D 39/163 96/66 |
| 2006/0016340 A1* | 1/2006 | Braeunling | B01D 39/1623 96/134 |
| 2006/0172639 A1 | 8/2006 | Yamada et al. | |
| 2007/0045177 A1 | 3/2007 | Tokuda et al. | |
| 2008/0047430 A1* | 2/2008 | Kobori | D04H 1/54 95/283 |
| 2008/0120954 A1* | 5/2008 | Duello | B01D 39/163 55/528 |
| 2008/0153373 A1 | 6/2008 | Hall et al. | |
| 2009/0266759 A1* | 10/2009 | Green | B01D 39/163 210/489 |
| 2009/0288558 A1* | 11/2009 | Duello | B01D 39/163 96/27 |
| 2010/0159771 A1* | 6/2010 | Fujisawa | B32B 5/06 442/370 |
| 2013/0047856 A1 | 2/2013 | Takeuchi et al. | |
| 2014/0174934 A1* | 6/2014 | Meier | D04H 1/485 204/665 |
| 2016/0074790 A1* | 3/2016 | Kuroda | D04H 1/4291 55/528 |
| 2016/0175753 A1 | 6/2016 | Hidaka et al. | |

FOREIGN PATENT DOCUMENTS

| | | |
|---|---|---|
| CN | 1816377 A | 8/2006 |
| EP | 2567744 A1 | 3/2013 |
| JP | 2000-170068 A | 6/2000 |
| JP | 2000-189732 A | 7/2000 |
| JP | 2002-316010 A | 10/2002 |
| JP | 2009-195898 A | 9/2009 |
| JP | 2010-513747 A | 4/2010 |
| JP | 2011-235219 A | 11/2011 |
| JP | 2011235219 A | 11/2011 |
| JP | 2014-004555 A | 1/2014 |
| WO | 97/40913 A1 | 11/1997 |
| WO | 99/52619 A1 | 10/1999 |
| WO | 2014/196564 A1 | 12/2014 |

OTHER PUBLICATIONS

International Search Report for PCT/JP2015/070769 dated Sep. 8, 2015.
English Translation of the Written Opinion of the International Searching Authority for PCT/JP2015/070769 dated Sep. 8, 2015.

* cited by examiner

FILTRATION MATERIAL, FILTER ELEMENT USING SAME, AND MANUFACTURING METHOD OF FILTRATION MATERIAL

CROSS REFERENCE TO RELATED APPLICATIONS

This application is a national stage filing under section 371 of International Application No. PCT/JP2015/070769, filed on Jul. 22, 2015, and published in Japanese on Feb. 4, 2016, as WO 2016/017484 A1 and claims priority to Japanese Application Nos. 2014-154668, filed on Jul. 30, 2014 and 2014-174449, filed on Aug. 28, 2014. The entire disclosures of each of the prior applications are hereby incorporated herein by reference.

TECHNICAL FIELD

The present invention relates to a filtration material, which may be used for an air filter, a mask, or the like, a filter element using the filtration material, and a method of manufacturing a filtration material. In particular, the present invention relates to a three-layer filtration material, which may be used for an air filter, a mask, or the like, a filter element using the three-layer filtration material, and a method of manufacturing a three-layer filtration material.

BACKGROUND ART

Conventionally, a filtration material has been used in order to collect dust in the air. Since it is preferable that such a filtration material has a low pressure drop and a high dust filtering efficiency, a charged filtration material is used to satisfy such requirements. As the charged filtration material, a filtration material prepared by charging two or more types of fibers different in constituent resin by friction, based on the difference in the triboelectric series, is known.

For example, the applicant proposed "a charged nonwoven fabric consisting of a plurality of clean fiber components, wherein the fiber components are charged by friction therebetween, characterized in that the plural fiber components comprise polyolefin-based fibers, and acrylic-based fibers spun by an inorganic solvent" (Patent literature 1). This charged nonwoven fabric had the above-mentioned properties, i.e., a low pressure drop and a high dust filtering efficiency. However, when a filtration material is used, such as a case where pleat processing is carried out, and its periphery is fixed with an outer frame to prepare a filter element, there is a case where a certain degree of rigidity is needed. However, the rigidity of the charged nonwoven fabric was insufficient, and it was unlikely to be used as a filtration material.

Further, in addition to Patent literature 1, the applicant proposed "a charged-type air filter, wherein a prefilter and a main filter are laminated, and at least one of the filters is charged, characterized in that the prefilter is a triboelectrically-charged-type nonwoven fabric comprising clean polyolefin-based fibers, and clean acrylic-based fibers spun by an inorganic solvent, and the main filter is a melt-blown nonwoven fabric" (Patent literature 2), and "a charged filter in which a prefilter layer, a main filter layer, and a backup filter layer are laminated, characterized in that the prefilter layer is made of a charged nonwoven fabric having a mass per unit area of 40-120 g/m$^2$, in which fibers having an average fineness of 1-6 dtex are entangled with each other, the main filter layer is made of a charged nonwoven fabric consisting of fibers having an average fiber diameter of 10 µm or less, the backup filter layer is made of a charged nonwoven fabric having a mass per unit area of 100-300 g/m$^2$, in which fibers having an average fineness of 1-6 dtex are entangled with each other, and the mass per unit area of the backup filter layer is higher than that of the prefilter layer" (Patent literature 3).

These charged filters disclose that, in addition to the above-mentioned triboelectrically-charged-type nonwoven fabric, a melt-blown nonwoven fabric, another triboelectrically-charged nonwoven fabric, or the like may be laminated, and disclose methods of unifying a laminate, such as ultrasonic seal, an adhesive, fiber bonding, or the like. However, when a laminate was unified by these methods, the triboelectrically-charged filter was affected not a little by heat or moisture, and therefore, there was a tendency that the amount of electrical charge would become small, and the filtering efficiency would decrease. Further, in the process of conveying after the production of these charged filters, there was a tendency that when they were brought into contact with conveying rollers, the charge escaped from the charged filters through the conveying rollers, and the filtering efficiency decreased.

Furthermore, when the charged filters disclosed Patent literatures 1-3 were used for applications requiring flame-resistance, like the case where they were used as interior filters for automobile or the like, the flame-resistance was insufficient, and they could not be used for the applications.

CITATION LIST

Patent Literature

[Patent literature 1] JP 2000-170068 A
[Patent literature 2] JP 2000-189732 A
[Patent literature 3] JP 2002-316010 A

SUMMARY OF INVENTION

Technical Problem

The present invention has been made under these circumstances, and an object is to provide a filtration material, in which rigidity is high and a decline in filtering efficiency is unlikely to occur; a filter element using the filtration material; and a method of manufacturing a filtration material. In particular, an object is to provide a three-layer filtration material, in which rigidity is high, a decline in filtering efficiency is unlikely to occur, and flame-resistance is excellent; a filter element using the three-layer filtration material; and a method of manufacturing a three-layer filtration material.

Solution to Problem

The present invention relates to:
[1] a filtration material characterized by comprising a bulky fiber sheet layer having a thickness of 0.5 mm or more, and a triboelectrically-charged nonwoven fabric layer in which two or more types of fibers different in constituent resin are mixed, wherein constituent fibers of the triboelectrically-charged nonwoven fabric layer penetrate into the bulky fiber sheet layer,
[2] the filtration material of [1], characterized in that the bulky fiber sheet layer is made of a fiber-fused nonwoven fabric,

[3] the filtration material of [1] or [2], characterized by comprising fibers having a fineness of 15 dtex or more, as constituent fibers of the bulky fiber sheet layer,

[4] the filtration material of any one of [1] to [3], characterized by comprising fusible fibers, as constituent fibers of the triboelectrically-charged nonwoven fabric layer, wherein the fusible fibers are fused,

[5] a filter element characterized by comprising the filtration material of any one of [1] to [4] in a pleated state,

[6] a method of manufacturing a filtration material characterized by comprising the steps of:

(1) laminating a bulky fiber sheet having a thickness of 0.5 mm or more, and a fiber web in which two or more types of fibers different in constituent resin are mixed, to form a laminated sheet, (2) penetrating constituent fibers of the fiber web into the bulky fiber sheet, to form a unified sheet having a bulky fiber sheet layer and a nonwoven fabric layer, (3) washing the unified sheet to form a washed sheet from which an oil agent is removed, and (4) deforming the washed sheet in the thickness direction, and charging the nonwoven fabric layer by friction, to form a filtration material comprising a bulky fiber sheet layer and a triboelectrically-charged nonwoven fabric layer,

[7] the method of [6], characterized in that the bulky fiber sheet is a fiber web containing fusible fibers, and after the formation of the unified sheet and before the charging of the nonwoven fabric layer by friction, the fusible fibers are fused to form a bulky fiber sheet layer made of a fiber-fused nonwoven fabric,

[8] the method of [6] or [7], characterized in that the constituent fibers of the fiber web are penetrated into the bulky fiber sheet by the action of needles from a fiber web side of the laminated sheet,

[9] the method of any one of [6] to [8], characterized in that the washed sheet is passed through a gap narrower than the thickness of the washed sheet, to deform the washed sheet in the thickness direction,

[10] the filtration material of [1], which is a three-layer filtration material consisting of two bulky fiber sheet layers and a triboelectrically-charged nonwoven fabric layer,

[11] the three-layer filtration material of [10], characterized in that the triboelectrically-charged nonwoven fabric layer in which two or more types of fibers different in constituent resin are mixed is located between the bulky fiber sheet layers having a thickness of 0.5 mm or more, wherein the constituent fibers of the triboelectrically-charged nonwoven fabric layer penetrate into the bulky fiber sheet layers, and both bulky fiber sheet layers contain fibers having a limiting oxygen index of 20 or more as constituent fibers, and have a mass per unit area 0.5 times or more than that of the triboelectrically-charged nonwoven fabric layer,

[12] a filter element characterized by comprising the three-layer filtration material of [11] in a pleated state, and

[13] a method of manufacturing a three-layer filtration material characterized by comprising the steps of:

(1) providing a mixed fiber web in which two or more types of fibers different in constituent resin are mixed, (2) providing two bulky fiber sheets containing fibers having a limiting oxygen index of 20 or more, said bulky fiber sheets having a thickness of 0.5 mm or more, and a mass per unit area 0.5 times or more than that of the mixed fiber web, (3) sandwiching the mixed fiber web between the bulky fiber sheets to form a three-layer sheet, (4) penetrating constituent fibers of the mixed fiber web into the bulky fiber sheets, to form a unified three-layer sheet in which a mixed nonwoven fabric layer is located between bulky fiber sheet layers, (5) washing the unified three-layer sheet to form a washed three-layer sheet from which an oil agent is removed, and (6) deforming the washed three-layer sheet in the thickness direction, and charging the mixed nonwoven fabric layer by friction, to form a three-layer filtration material in which a triboelectrically-charged nonwoven fabric layer is located between the bulky fiber sheet layers.

Advantageous Effects of Invention

The filtration material of [1] of the present invention has the bulky fiber sheet layer having a thickness of 0.5 mm or more, in addition to the triboelectrically-charged nonwoven fabric layer, and therefore, it is a filtration material having a high rigidity. Further, during transportation of the filtration material, during processing of the filtration material, or when using the filtration material, the bulky fiber sheet layer is bulky and relatively likely to be deformed, and the constituent fibers of the triboelectrically-charged nonwoven fabric layer are penetrated into the bulky fiber sheet layer, and as a result, when the bulky fiber sheet layer is deformed, the penetrating constituent fibers of the triboelectrically-charged nonwoven fabric layer are easily charged by friction between the fibers, and therefore, it is a filtration material in which the amount of electrical charge is unlikely to decrease, and a decline in filtering efficiency is unlikely to occur.

The filtration material of [2] of the present invention is likely to be deformed, because the bulky fiber sheet layer is made of a fiber-fused nonwoven fabric. The penetrating constituent fibers of the triboelectrically-charged nonwoven fabric layer are easily charged by friction between the fibers, and therefore, the amount of electrical charge is unlikely to decrease, and a decline in filtering efficiency is unlikely to occur.

The filtration material of [3] of the present invention comprises thick fibers having a fineness of 15 dtex or more, as the constituent fibers of the bulky fiber sheet layer, and therefore, it exhibits a high rigidity.

The filtration material of [4] of the present invention comprises fusible fibers, as the constituent fibers of the triboelectrically-charged nonwoven fabric layer, and the fusible fibers are fused, and therefore, it exhibits a high rigidity. Further, it is a filtration material in which fuzzing is unlikely to occur, and fibers are hardly dropped therefrom.

The filter element of [5] of the present invention comprises the filtration material in a pleated state, and the filtration material exhibits a high rigidity, and further the constituent fibers of the triboelectrically-charged nonwoven fabric layer are easily charged by friction between the fibers, and therefore, the amount of electrical charge is unlikely to decrease, and a decline in filtering efficiency is unlikely to occur.

The method of manufacturing a filtration material of [6] of the present invention is a method in which, after the formation of a unified sheet, an oil agent is removed so as to become a state where triboelectric charging easily occurs, and the washed sheet is deformed in the thickness direction to charge it by friction, and therefore, it can be produced without influence from heat and moisture during the unification. Further, because the washed sheet can be charged by deforming it in the thickness direction when it is conveyed, a filtration material, in which the amount of electrical charge is unlikely to decrease, and a decline in filtering efficiency is unlikely to occur, can be produced. Furthermore, since a bulky fiber sheet is used, a filtration material having a high rigidity can be produced.

In the method of manufacturing a filtration material of [7] of the present invention, the fusible fibers are fused before the charging of the nonwoven fabric layer by friction, and it is not affected by heat during the fusion, and therefore, a filtration material, in which the amount of electrical charge is unlikely to decrease, and a decline in filtering efficiency is unlikely to occur, can be produced.

In the method of manufacturing a filtration material of [8] of the present invention, the constituent fibers of the fiber web are penetrated into the bulky fiber sheet by the action of needles from the fiber web side of the laminated sheet, and fibers can be reliably oriented in the thickness direction, in which the constituent fibers of the fiber web are easily charged by friction, and therefore, a filtration material, in which the amount of electrical charge is unlikely to decrease, and a decline in filtering efficiency is unlikely to occur, can be produced.

In the method of manufacturing a filtration material of [9] of the present invention, since a washed sheet is reliably deformed in the thickness direction by passing it through a gap narrower than the thickness of the washed sheet, a filtration material, in which the amount of electrical charge is unlikely to decrease, and a decline in filtering efficiency is unlikely to occur, can be produced. Further, the method has a feature that a simple machine configuration, such as a pair of conveying rollers, can be achieved.

The three-layer filtration material of [10] or [11] of the present invention has two bulky fiber sheet layers having a thickness of 0.5 mm or more, in addition to the triboelectrically-charged nonwoven fabric layer, and therefore, it is a three-layer filtration material having a high rigidity.

During transportation of the three-layer filtration material of [10] or [11] of the present invention, during processing of the three-layer filtration material, or when using the three-layer filtration material, the bulky fiber sheet layer is bulky and relatively likely to be deformed, and the constituent fibers of the triboelectrically-charged nonwoven fabric layer are penetrated into the bulky fiber sheet layer, and as a result, when the bulky fiber sheet layer is deformed, the penetrating constituent fibers of the triboelectrically-charged nonwoven fabric layer are easily charged by friction between the fibers, and therefore, it is a three-layer filtration material in which the amount of electrical charge is unlikely to decrease, and a decline in filtering efficiency is unlikely to occur.

Further, in the three-layer filtration material of [11], both bulky fiber sheet layers, which constitute both surface layers, contain fibers having a limiting oxygen index of 20 or more as constituent fibers, and have a mass per unit area 0.5 times or more than that of the triboelectrically-charged nonwoven fabric layer, and therefore, it is a three-layer filtration material having a good flame-resistance.

The filter element of [12] of the present invention comprises the three-layer filtration material in a pleated state. The three-layer filtration material has a high rigidity, and the constituent fibers of the triboelectrically-charged nonwoven fabric layer are easily charged by friction between the fibers, and therefore, it is a filter element in which the amount of electrical charge is unlikely to decrease, and a decline in filtering efficiency is unlikely to occur. Further, it is a filter element having a good flame-resistance.

The method of manufacturing a three-layer filtration material of [13] of the present invention is a method in which after the formation of a unified three-layer sheet, an oil agent is removed so as to become a state where triboelectric charging easily occurs, and the washed three-layer sheet is deformed in the thickness direction to charge it by friction, and therefore, it can be produced without influence from heat and moisture during the unification. Further, because the washed three-layer sheet can be charged by deforming it in the thickness direction when it is conveyed, a three-layer filtration material, in which the amount of electrical charge is unlikely to decrease, and a decline in filtering efficiency is unlikely to occur, can be produced.

Further, since two bulky fiber sheets are used, a three-layer filtration material having a high rigidity can be produced.

Furthermore, since three layers are laminated so that the bulky fiber sheets containing fibers with a limiting oxygen index of 20 or more, and having a mass per unit area 0.5 times or more than that of the mixed fiber web form both surface layers, a three-layer filtration material having a good flame-resistance can be produced.

DESCRIPTION OF EMBODIMENTS

Figure 1:
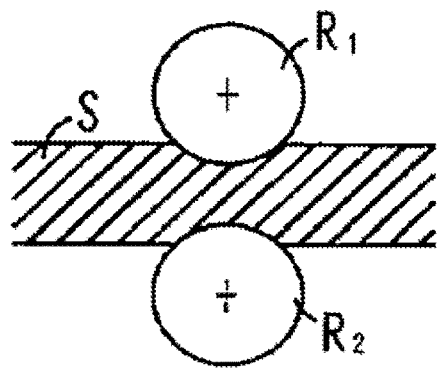
FIG. 1 is a schematic cross-sectional view of an apparatus capable of deforming a washed sheet in the thickness direction.

Hereinafter, the filtration material consisting of two or more layers of the present invention, the filter element using the filtration material, and the method of manufacturing a filtration material will be explained, and then, the three-layer filtration material of the present invention, which is a preferred embodiment, the filter element using the three-layer filtration material, and the method of manufacturing a three-layer filtration material will be explained.

Since the filtration material of the present invention comprises the bulky fiber sheet layer having a thickness of 0.5 mm or more, it has a high rigidity, and during transportation of the filtration material, during processing of the filtration material, or when using the filtration material, by deforming (in particular, deforming in the thickness direction) the bulky fiber sheet layer, the constituent fibers of the triboelectrically-charged nonwoven fabric layer, which penetrate into the bulky fiber sheet layer, are easily charged by friction between the fibers, and therefore, it is a filtration material in which the amount of electrical charge is unlikely to decrease, and a decline in filtering efficiency is unlikely to occur.

As described above, the thickness of the bulky fiber sheet layer is 0.5 mm or more so that it has a high rigidity and a good deformability. Since the thicker the thickness is, the better these effects are, the thickness is preferably 1 mm or more, more preferably 1.5 mm or more, still more preferably 2 mm or more, and still more preferably 2.5 mm or more. On the other hand, if the thickness is more than 100 mm, form stability tends to be poor, and excessive thickness results in reduced versatility, and therefore, the thickness is preferably 100 mm or less, more preferably 50 mm or less, still more preferably 30 mm or less, still more preferably 20 mm or less, still more preferably 10 mm or less, and still more preferably 5 mm or less. The "thickness" as used herein means a thickness measured using a compressive elasticity tester at a load of 1.96 kPa.

The bulky fiber sheet layer is not particularly limited, so long as it has an appropriate rigidity and an appropriate deformability. Examples of the bulky fiber sheet layer include a nonwoven fabric to which one bonding means or two or more bonding means, such as fiber fusing, needle punching, water entanglement, binder bonding, or the like, are applied. Among these, a fiber-fused nonwoven fabric or a binder-bonded nonwoven fabric is preferable, because they are superior in rigidity and deformability, and in particular, a fiber-fused nonwoven fabric is more preferable, because the entire fiber surface can contribute to filtration.

The fibers that constitute the bulky fiber sheet layer are not particularly limited, but examples of the fibers include: synthetic fibers, such as polyester fibers, polyamide fibers, polyvinyl alcohol fibers, polyvinylidene chloride fibers, polyvinyl chloride fibers, acrylic fibers, or polyolefin fibers; regenerated fibers, such as rayon fibers; semi-synthetic fibers, such as acetate fibers; inorganic fibers, such as glass fibers; plant fibers, such as cotton or hemp; animal fibers, such as wool; and the like. Among these, synthetic fibers are preferable, because the amount of electrical charge of the triboelectrically-charged nonwoven fabric layer, as described below, can be easily maintained and improved by friction between the synthetic fibers and the constituent fibers of the triboelectrically-charged nonwoven fabric layer. Among these synthetic fibers, polyester fibers are preferable, because they have a high rigidity.

It is preferable that the bulky fiber sheet layer is made of the fiber-fused nonwoven fabric, as described above, and it is preferable that the fiber-fused nonwoven fabric contains fusible fibers having a fusible resin on the fiber surface, and the fusible fibers are fused. Examples of the fusible fibers include fusible fibers having, for example, a polyester-based resin, a polyamide-based resin, a polyvinylidene chloride-based resin, a polyvinyl chloride-based resin, or a polyolefin resin, on the fiber surface. Polyester fibers having a high rigidity are preferable, as described above, and therefore, fusible fibers having a polyester-based resin on the fiber surface are preferable.

The fusible fiber is not particularly limited, so long as it has one or more resins as described above on the fiber surface. The fusible fiber may be made of one kind of resin, but it is preferable that the fusible fiber is made of two or more resins including resin(s) not involved in fusion, in addition to the resin(s) on the fiber surface involved in fusion, so that a fiber-fused nonwoven fabric (i.e., a bulky fiber sheet layer) that can maintain the fiber form and has a high rigidity, even after fusion, can be provided. For example, in the case where the fusible fiber is made of two kinds of resins, examples of the fusible fiber include a core-sheath type fusible fiber, in which a resin having a high melting point is coated with a resin having a low melting point, and a side-by-side type fusible fiber, in which a resin having a high melting point is bonded to a resin having a low melting point. In particular, the core-sheath type fusible fiber is preferable, because a bulky fiber sheet layer having a high rigidity can be provided.

A fusible fiber having a polyester-based resin on the fiber surface is preferable, as described above, and therefore, the combination of resins is preferably polyethylene terephthalate/copolymerized polyester, polyethylene terephthalate/polybutylene terephthalate, or polyethylene terephthalate/polytrimethylene terephthalate, and in particular, the combination of resins is preferably (a core component)/(a sheath component).

The fineness of the fibers that constitute the bulky fiber sheet layer is not particularly limited, but the bulky fiber sheet layer contains preferably fibers having a fineness of 15 dtex or more, more preferably fibers having a fineness of 18 dtex or more, and still more preferably fibers having a fineness of 20 dtex or more, so that the rigidity of the filtration material becomes high by the bulky fiber sheet layer. On the other hand, because if the fineness is too high, the mechanical filtering efficiency tends to decrease, it is preferable that the fineness is 50 dtex or less. Since the more the fibers having a fineness of 15 dtex or more are contained, the higher the rigidity of the filtration material becomes, the content of the fibers in the bulky fiber sheet layer is preferably 30 mass % or more, more preferably 45 mass % or more, and still more preferably 65 mass % or more. On the other hand, from the viewpoint of improving the mechanical filtering efficiency, the bulky fiber sheet layer also contains preferably fibers having a fineness of less than 15 dtex, more preferably fibers having a fineness of 12 dtex or less, and still more preferably fibers having a fineness of 10 dtex or less.

The term "fineness" as used herein means a value obtained by Method A defined in JIS L 1015:2010, 8.5.1 (Fineness based on corrected weight).

The fiber length of the fibers that constitute the bulky fiber sheet layer is not particularly limited, but it is preferably 30 mm or more, more preferably 40 mm or more, and still more preferably 50 mm or more, so that the rigidity of the filtration material becomes high by the bulky fiber sheet layer. On the other hand, if the fiber length is too long, there is a tendency that it becomes difficult to uniformly disperse the fibers, and as a result, the filtering efficiency tends to decrease, and therefore, the fiber length is preferably 150 mm or less. The term "fiber length" as used herein means a value obtained by JIS L 1015:2010, 8.4.1 [Corrected staple diagram method (Method B)].

The mass per unit area of the bulky fiber sheet layer is not particularly limited, so long as the thickness is 0.5 mm or more, but it is preferably 40 to 200 g/m$^2$, more preferably 70 to 150 g/m$^2$, and still more preferably 90 to 110 g/m$^2$, so that the bulky fiber sheet layer shows a high rigidity.

The apparent density of the bulky fiber sheet layer is not particularly limited, so long as the thickness is 0.5 mm or more, but it is preferably 0.02 to 0.1 g/cm$^3$, more preferably 0.04 to 0.08 g/cm$^3$, and still more preferably 0.05 to 0.07 g/cm$^3$, so that the bulky fiber sheet layer is easily deformed. The term "apparent density" as used herein means a calculated value obtained by dividing a mass per unit area by a thickness.

The filtration material of the present invention comprises, in addition to the bulky fiber sheet layer, as described above, a triboelectrically-charged nonwoven fabric layer, in which two or more types of fibers different in constituent resin are mixed. Since the constituent fibers of the triboelectrically-charged nonwoven fabric layer penetrate into the bulky fiber sheet layer, it is a filtration material in which the amount of electrical charge is unlikely to decrease, and a decline in filtering efficiency is unlikely to occur. That is to say, during transportation of the filtration material of the present invention, during processing of the filtration material, or when using the filtration material, the bulky fiber sheet layer is likely to be deformed, and when the bulky fiber sheet layer is deformed, the penetrating constituent fibers of the triboelectrically-charged nonwoven fabric layer are easily charged by friction between the fibers, and therefore, it is a filtration material in which the amount of electrical charge is unlikely to decrease, and a decline in filtering efficiency is unlikely to occur.

The triboelectrically-charged nonwoven fabric layer of the present invention is made of a nonwoven fabric, in which two or more types of fibers different in constituent resin are mixed, and the nonwoven fabric is charged by friction. Its constituent fibers can be triboelectrically-charged, so long as the constituent resins are different from each other, but it is preferable that fibers in which the triboelectric series of the resins are apart from each other are mixed, so that the amount of electrical charge is sufficient. Examples of such a combination include a combination of a polyolefin-based fiber with an acrylic-based fiber; a combination of a fluorine-based fiber with a polyamide fiber, wool, a glass fiber, silk, or a rayon fiber; a combination of a urethane fiber with a polyamide fiber, wool, a glass fiber, silk, or a rayon fiber; a combination of a polyvinyl chloride fiber with a polyamide fiber, wool, a glass fiber, silk, or a rayon fiber; a combination of a polyolefin-based fiber with a polyamide fiber, wool, a glass fiber, silk, or a rayon fiber; a combination of an acrylic fiber with a polyamide fiber, wool, a glass fiber, silk, or a rayon fiber; a combination of a vinylon fiber with a polyamide fiber, wool, a glass fiber, silk, or a rayon fiber; a combination of a polyester fiber with a polyamide fiber, wool, a glass fiber, silk, or a rayon fiber; a combination of an acetate fiber with a polyamide fiber, wool, a glass fiber, silk, or a rayon fiber; and the like. Among these, the combination of a polyolefin-based fiber with an acrylic-based fiber is preferable, because the amount of electrical charge is large.

The phrase "different in constituent resin" as used herein means that constituent resins which constitute the fiber surface (excluding both ends) are different from each other. In the case where a resin that constitutes the inside of a fiber is the same as a constituent resin of another fiber, if constituent resins that constitute the fiber surface (excluding both ends) are different from each other, they are regarded as fibers different in constituent resin.

As described above, the constituent fibers of the triboelectrically-charged nonwoven fabric layer is preferably the combination of a polyolefin-based fiber and an acrylic-based fiber. Examples of the constituent resin of the polyolefin-based fiber include a polypropylene resin, a polyethylene resin, a polystyrene resin, a vinyl acetate copolymer resin, an ethylene-propylene copolymer, or a resin prepared by substituting a cyano group or a halogen for part of these resins. The polyolefin-based fiber may be made of one kind of these constituent resins, or may be a composite fiber consisting of two or more kinds of these constituent resins. For example, it may be a core-sheath type composite fiber, and may be a polyolefin-based fiber in which the sheath component is a polyolefin-based resin.

In the case of a polyolefin-based fiber, which is preferable, it is preferable that it contains a phosphorus-based additive and a sulfur-based additive, because the initial filtering efficiency is improved by containing the phosphorus-based additive and the sulfur-based additive. In addition to the phosphorus-based additive and the sulfur-based additive, other additives, such as a phenol-based additive, an amine-based additive, or the like, may be further contained.

The content of the phosphorus-based additive in the polyolefin-based fiber is preferably 0.01 mass % or more, more preferably 0.2 mass % or more, still more preferably 0.3 mass % or more, and still more preferably 0.6 mass % or more.

Examples of the phosphorus-based additive include phosphorus-based antioxidants, such as tris(nonylphenyl) phosphite; tris(2,4-di-t-butylphenyl) phosphite; distearyl pentaerythritol diphosphite; bis(2,4-di-t-butylphenyl) pentaerythritol phosphite; bis(2,6-di-t-butyl-4-methylphenyl) pentaerythritol phosphite; 2,2-methylenebis(4,6-di-t-butylphenyl)octyl phosphite; tetrakis(2,4-di-t-butylphenyl)-4,4'-biphenylene di-phosphonite; phosphorous acid, bis(2,4-bis(1,1-dimethylethyl)-6-methylphenyl) ethyl ester; tetrakis (2,4-di-t-butylphenyl)(1,1-biphenyl)-4,4'-diylbisphosphonite; bis(bis(2,4-di-t-butyl-5-methylphenoxy)phosphino); or the like.

As the sulfur-based additive, for example, sulfur-based antioxidants, such as dilauryl-3,3'-thiodipropionate, dimyristyl-3,3'-thiodipropionate, distearyl-3,3'-thiodipropionate, pentaerythritol tetrakis, or the like, may be preferably used. The content of the sulfur-based additive in the polyolefin-based fiber is preferably 0.01 mass % or more, and more preferably 0.1 mass % or more.

Since when the total content of the phosphorus-based additive and the sulfur-based additive is high, spinnability tends to be poor, the total content of the phosphorus-based additive and the sulfur-based additive with respect to the polyolefin-based fibers is preferably 5 mass % or less, more preferably 2 mass % or less, and still more preferably 1 mass % or less.

On the other hand, as the acrylic fiber, either a polyacrylonitrile-based fiber containing acrlylonitrile as the main component (85% or more) or a modacrylic fiber containing acrylonitrile at a content of 35% or more and less than 85% may be used. Polyacrylonitrile-based fibers include two types, i.e., a fiber spun using an organic solvent and a fiber spun using an inorganic solvent, and either of them may be used.

It is preferable that fusible fibers are contained as the constituent fibers of the triboelectrically-charged nonwoven fabric layer, because when the filtration material contains fusible fibers as the constituent fibers of the triboelectrically-charged nonwoven fabric layer, and the fusible fibers are fused, the filtration material has a high rigidity, and further, fuzzing is unlikely to occur, and fibers are hardly dropped therefrom.

Such fusible fibers may be the same fusible fibers as those that can constitute the bulky fiber sheet layer. That is to say, fusible fibers having, for example, a polyester-based resin, a polyamide-based resin, a polyvinylidene chloride-based resin, a polyvinyl chloride-based resin, or a polyolefin resin, on the fiber surface, may be exemplified, and fusible fibers having a polyester-based resin, which has a high rigidity, on the fiber surface, are preferable.

The fusible fiber, which constitutes the triboelectrically-charged nonwoven fabric layer, is not particularly limited, so long as it has one or more resins as described above on the fiber surface. The fusible fiber may be made of one kind of resin, but it is preferable that the fusible fiber is made of two or more resins including resin(s) not involved in fusion, in addition to the resin(s) on the fiber surface involved in fusion, so that a triboelectrically-charged nonwoven fabric layer having a high rigidity can be provided. For example, in the case where the fusible fiber is made of two kinds of resins, examples of the fusible fiber include a core-sheath type fusible fiber, in which a resin having a high melting point is coated with a resin having a low melting point, and a side-by-side type fusible fiber, in which a resin having a high melting point is bonded to a resin having a low melting point. In particular, the core-sheath type fusible fiber is preferable, because a triboelectrically-charged nonwoven fabric layer having a high rigidity can be provided.

A fusible fiber having a polyester-based resin on the fiber surface is preferable, as described above, and therefore, the combination of resins is preferably polyethylene terephthalate/copolymerized polyester, polyethylene terephthalate/polybutylene terephthalate, or polyethylene terephthalate/polytrimethylene terephthalate, and in particular, the combination of resins is preferably (a core component)/(a sheath component).

In the case where the bulky fiber sheet layer contains the fusible fibers, the fusible fibers that constitute the triboelectrically-charged nonwoven fabric layer may be the same as, or different from those that constitute the bulky fiber sheet layer, but it is preferable that they are the same, because the bulky fiber sheet layer is firmly fused with the triboelectrically-charged nonwoven fabric layer, and a filtration material in which delamination is difficult to occur can be provided.

In the present invention, it is preferable that the triboelectrically-charged nonwoven fabric layer contains the polyolefin-based fibers and the acrylic fibers, as described above, and in the case where the fusible fibers are contained, the fusible fibers may be contained in addition to the polyolefin-based fibers and the acrylic fibers, or the fusible fibers may be used instead of the acrylic fibers, and the fusible fibers and polyolefin-based fibers may be contained.

The fineness of the fibers that constitute the triboelectrically-charged nonwoven fabric layer is not particularly limited, but it is preferably 10 dtex or less, more preferably 7 dtex or less, still more preferably 5 dtex or less, and still more preferably 3 dtex or less, because when the surface area of the fiber is large, fibers are easily rubbed, and the amount of electrical charge becomes large, and therefore, improvement in filtration efficiency due to charging can be expected. On the other hand, when the fibers become too thin, there is a tendency that pressure drop easily increases, and therefore, the fineness is preferably 0.1 dtex or more, more preferably 0.5 dtex or more, and still more preferably 1 dtex or more.

The fiber length of the fibers that constitute the triboelectrically-charged nonwoven fabric layer is not particularly limited, but it is preferably 20 mm or more, more preferably 35 mm or more, and still more preferably 50 mm or more, so that the fibers penetrate into the bulky fiber sheet layer, and it becomes a state where triboelectric charging easily occurs, when the bulky fiber sheet layer is deformed. On the other hand, if the fiber length is too long, there is a tendency that it becomes difficult to uniformly disperse the fibers, and as a result, the filtering efficiency tends to decrease, and therefore, the fiber length is preferably 150 mm or less.

The triboelectrically-charged nonwoven fabric layer in the present invention is a layer in which two or more types of fibers different in constituent resin are mixed. The mixing ratio of the fibers different in constituent resin varies depending on the combination of the fibers, and therefore, is not particularly limited, so long as triboelectric charging efficiently occurs. The ratio of the number of positively-charged fibers to the number of negatively-charged fibers is preferably 1:0.5-2, more preferably 1:0.75-1.5, and still more preferably 1:0.8-1.2, so that the constituent fibers are easily charged by friction between the fibers. For example, in the case where polyolefin-based fibers (fineness: 2.2 dtex, fiber length: 51 mm, density: 0.9 g/cm$^3$) and acrylic-based fibers (fineness: 2.2 dtex, fiber length: 51 mm, density: 1.14 g/cm$^3$) are mixed, as a preferred embodiment, the mass ratio of the polyolefin-based fibers to the acrylic-based fibers is preferably about 39:61-72:28, more preferably about 46:54-63:37, and still more preferably about 51:49-62:38.

Even when the triboelectrically-charged nonwoven fabric layer contains fusible fibers, it is preferably that the fusible fibers are mixed so that the ratio of the number of positively-charged fibers to the number of negatively-charged fibers is within the above-mentioned range, because the constituent fibers are easily charged by friction between the fibers. In general, in order to impart rigidity and inhibit fuzzing of the triboelectrically-charged nonwoven fabric layer, the fusible fibers account for preferably 15 mass % or more, and more preferably 20 mass % or more of the triboelectrically-charged nonwoven fabric layer. On the other hand, when the amount of the fusible fibers becomes large, the amount of fibers that contribute to triboelectric charging becomes small, and there is a tendency that it cannot be sufficiently charged, and therefore, the fusible fibers account for preferably 60 mass % or less, more preferably 50 mass % or less, and still more preferably 40 mass % or less of the triboelectrically-charged nonwoven fabric layer.

The mass per unit area of the triboelectrically-charged nonwoven fabric layer is not particularly limited, but since it is preferable that the layer contains a certain amount of fibers so that the amount of electrical charge becomes large, it is preferably 20 g/m$^2$ or more, more preferably 30 g/m$^2$ or more, and still more preferably 40 g/m$^2$ or more. On the other hand, when the mass per unit area is too large, in order not to increase pressure drop, it is preferably 200 g/m$^2$ or less, more preferably 180 g/m$^2$ or less, and still more preferably 150 g/m$^2$ or less. In particular, the amount of fibers that contribute to triboelectric charging in the triboelectrically-charged nonwoven fabric layer is preferably 20 g/m$^2$ or more, more preferably 30 g/m$^2$ or more, still more preferably 35 g/m$^2$ or more, still more preferably 40 g/m$^2$ or more, and still more preferably 45 g/m$^2$ or more, so that the amount of electrical charge becomes large. On the other hand, the amount of fibers that contribute to triboelectric charging in the triboelectrically-charged nonwoven fabric layer is preferably 200 g/m$^2$ or less, more preferably 180 g/m$^2$ or less, and still more preferably 150 g/m$^2$ or less, so that pressure drop is unlikely to increase.

The thickness of the triboelectrically-charged nonwoven fabric layer is not particularly limited, but it is preferably 0.5 mm or more, more preferably 1 mm or more, still more preferably 1.5 mm or more, and still more preferably 2 mm or more, so that not only the bulky fiber sheet layer, but also the triboelectrically-charged nonwoven fabric layer per se is deformed in the thickness direction, and as a result, the constituent fibers of the triboelectrically-charged nonwoven fabric layer, which do not penetrate into the bulky fiber sheet layer, are charged by friction between the fibers, and the amount of electrical charge becomes easily large. On the other hand, the thickness is preferably 3 mm or less, so that it is a filtration material having a good form stability and a good versatility.

The apparent density of the triboelectrically-charged nonwoven fabric layer is not particularly limited, but it is preferably 0.02 to 0.2 g/cm$^3$, and more preferably 0.05 to 0.1 g/cm$^3$, so that there exists a certain amount of fibers, and it has flexibility to be charged by friction between the fibers.

The fibers that constitute the triboelectrically-charged nonwoven fabric layer penetrate into the bulky fiber sheet layer, and the fibers are charged by friction when the bulky fiber sheet layer is deformed (in particular, in the thickness direction), and therefore, it is a filtration material in which the amount of electrical charge is unlikely to decrease, and a decline in filtering efficiency is unlikely to occur. That is to say, like the case where the triboelectrically-charged nonwoven fabric layer and the bulky fiber sheet layer are simply laminated, in the case where the fibers that constitute the triboelectrically-charged nonwoven fabric layer do not penetrate into the bulky fiber sheet layer, even if the bulky fiber sheet layer is deformed, the fibers that constitute the triboelectrically-charged nonwoven fabric layer are unlikely to be charged by friction between the fibers. On the other hand, in the case where the fibers that constitute the triboelectrically-charged nonwoven fabric layer penetrate into the bulky fiber sheet layer, since the fibers that constitute the triboelectrically-charged nonwoven fabric layer are oriented in the thickness direction of the filtration material, the fibers that constitute the triboelectrically-charged nonwoven fabric layer are easily charged by friction between the fibers, when the bulky fiber sheet layer is deformed.

In connection with this, a filtration material, in which the fibers that constitute the triboelectrically-charged nonwoven fabric layer penetrate into the bulky fiber sheet layer, and the constituent fibers of the triboelectrically-charged nonwoven fabric layer are entangled with the constituent fibers of the bulky fiber sheet layer, is a preferred embodiment, because delamination between the triboelectrically-charged nonwoven fabric layer and the bulky fiber sheet layer is difficult to occur.

Although the filtration material of the present invention has the bulky fiber sheet layer and the triboelectrically-charged nonwoven fabric layer, as described above, it may have another layer, which does not inhibit triboelectric charging of the triboelectrically-charged nonwoven fabric layer caused by deformation of the bulky fiber sheet layer, on the outside of the bulky fiber sheet layer and/or the triboelectrically-charged nonwoven fabric layer. For example, the rigidity of the filtration material can be improved by laminating a net, a spunbond nonwoven fabric, or the like, and the filtration performance can be improved by laminating a melt-blown nonwoven fabric, a wet-laid nonwoven fabric, electrospun nonwoven fabric, or the like. Further, a filtration material having another bulky fiber sheet layer on the outside of the triboelectrically-charged nonwoven fabric layer, i.e., a filtration material in which the triboelectrically-charged nonwoven fabric layer is sandwiched between the bulky fiber sheet layers, is a filtration material having a more excellent rigidity.

The mass per unit area of the filtration material of the present invention is not particularly limited, but it is preferably 60-310 g/m$^2$, more preferably 100-230 g/m$^2$, and still more preferably 130-170 g/m$^2$.

The thickness of the filtration material is not particularly limited, but it is preferably 0.5-103 mm, more preferably 1.5-50 mm, still more preferably 2-30 mm, still more preferably 2.5-20 mm, still more preferably 3-10 mm, and still more preferably 3-5 mm, so that it is easily deformed in the thickness direction, and the amount of electrical charge becomes easily large.

It is preferable that the filtration material of the present invention has the bulky fiber sheet layer, and has a certain degree of rigidity, because a pleated state is preferable so that the filtration area is large, and an increase in pressure drop can be inhibited. More particularly, the bending resistance measured by a Gurley method as defined in JIS L 1913:2010, 6.7.4 is preferably 1 mN or more, more preferably 2.5 mN or more, and still more preferably 4 mN or more. In connection with this, each test piece is cut into a rectangle having a size of 30 mm×40 mm, and the side of 30 mm is fixed to a chuck so that pendulum B is brought into contact with the triboelectrically-charged nonwoven fabric layer side, and the measurement is carried out.

The filter element of the present invention comprises the filtration material as described above in a pleated state. Therefore, it has a high rigidity, and the fibers that constitute the triboelectrically-charged nonwoven fabric layer are easily charged by friction between the fibers, and therefore, it is a filter element in which the amount of electrical charge is unlikely to decrease, and a decline in filtering efficiency is unlikely to occur. In connection with this, since the filtration material of the present invention has a high rigidity, it is a filter element which can be well produced by pleating.

The filter element of the present invention may be the same as a conventional filter element, except that the filtration material as described above is used.

For example, pleating is not particularly limited, so long as a pleat can be formed by folding it in a zigzag shape. Pleating can be carried out by, for example, a pleating machine, such as a reciprocating type, a rotary type, or the like, or a method of pressing it with a stamp formed into a zigzag shape.

The pleated filtration material can be fixed using an outer frame, for example, by intervening a hot melt resin, such as polyvinyl acetate, between the outer frame and the filtration material. As the outer frame, for example, an outer frame made of aluminum, aluminum alloy, stainless steel, various resins, paper, or a nonwoven fabric (for example, the filtration material of the present invention) may be used.

The filtration material of the present invention may be produced, for example, by the following method, comprising the steps of:
(1) laminating a bulky fiber sheet having a thickness of 0.5 mm or more, and a fiber web in which two or more types of fibers different in constituent resin are mixed (hereinafter simply and sometimes referred to a "mixed fiber web"), to form a laminated sheet,
(2) penetrating constituent fibers of the mixed fiber web into the bulky fiber sheet, to form a unified sheet having a bulky fiber sheet layer and a nonwoven fabric layer,
(3) washing the unified sheet to form a washed sheet from which an oil agent is removed, and
(4) deforming the washed sheet in the thickness direction, and charging the nonwoven fabric layer by friction, to form a filtration material comprising a bulky fiber sheet layer and a triboelectrically-charged nonwoven fabric layer. Such a production method is a method in which, after the formation of a unified sheet, an oil agent is removed so as to become a state where triboelectric charging easily occurs, and the washed sheet is deformed in the thickness direction to charge it by friction, and therefore, it can be produced without influence from heat and moisture during the unification of the bulky fiber sheet layer and the triboelectrically-charged nonwoven fabric layer. Further, because the washed sheet can be charged by deforming it in the thickness direction when it is conveyed or the like, a filtration material, in which the amount of electrical charge is unlikely to decrease, and a decline in filtering efficiency is unlikely to occur, can be produced. Furthermore, since a bulky fiber sheet is used, a filtration material having a high rigidity can be produced.

More particularly, first, the step (1) of laminating a bulky fiber sheet having a thickness of 0.5 mm or more, and a mixed fiber web in which two or more types of fibers different in constituent resin are mixed, to form a laminated sheet, is carried out. The bulky fiber sheet having a thickness of 0.5 mm or more may be formed by a dry method, such as a card method, an air-laying method, or the like, using the fibers as described above. Since the bulky fiber sheet layer, which constitutes the filtration material of the present invention, is preferably made of a fiber-fused nonwoven fabric, it is preferable that the bulky fiber sheet is a fiber web containing fusible fibers (hereinafter sometimes referred to a "fiber web for bulky").

On the other hand, the mixed fiber web in which two or more types of fibers different in constituent resin are mixed may be formed by a dry method, such as a card method, an air-laying method, or the like, using the fibers as described above. Although the triboelectrically-charged nonwoven fabric layer, which constitutes the filtration material of the present invention, may be made of the fibers as described above, since it preferably contains polyolefin-based fibers and acrylic fibers so that the fibers are easily charged by friction, it is preferable that the mixed fiber web contains the polyolefin-based fibers and the acrylic fibers. Further, since the triboelectrically-charged nonwoven fabric layer preferably contains fusible fibers (hereinafter sometimes referred to as "fusible fibers for a charged layer") so that it has a high rigidity and good fuzzing-preventing properties, it is preferable that it contains fusible fibers for a charged layer, instead of the polyolefin-based fibers or the acrylic fibers, or in addition to the polyolefin-based fibers and the acrylic fibers.

Although a laminated sheet may be formed by laminating a bulky fiber sheet and a mixed fiber web, a laminated sheet may be formed by laminating a bulky fiber sheet and two or more mixed fiber webs, a mixed fiber web and two or more bulky fiber sheets, or two or more bulky fiber sheets and two or more mixed fiber webs, for example, by laminating mixed fiber webs on both sides of a bulky fiber sheet, or by laminating bulky fiber sheets on both sides of a mixed fiber web.

Next, the step (2) of penetrating constituent fibers of the mixed fiber web of the laminated sheet into the bulky fiber sheet, to form a unified sheet having a bulky fiber sheet layer and a nonwoven fabric layer, is carried out. The method of penetrating the constituent fibers of the mixed fiber web into the bulky fiber sheet is not particularly limited, but for example, a method of treating the laminated fiber sheet with needles from the mixed fiber web side of the laminated fiber sheet, or a method of treating the laminated fiber sheet with water jet from the mixed fiber web side of the laminated fiber sheet, may be exemplified. Among these methods, the method of treating it with needles is preferable, because the constituent fibers of the mixed fiber web are reliably oriented in the thickness direction, in which the constituent fibers of the mixed fiber web are easily charged by friction, and it is difficult to impair the bulkiness of the bulky fiber sheet. Further, the method of treating it with needles has characteristics that the constituent fibers of the mixed fiber web and the constituent fibers of the bulky fiber sheet are entangled by the action of needles, and that a filtration material, in which delamination between the bulky fiber sheet layer and the triboelectrically-charged nonwoven fabric layer is difficult to occur, can be produced.

The needle conditions, as a preferred embodiment, are not particularly limited, but it may be treated with needles, preferably at a needle density of 30 needles/cm$^2$ or more, and more preferably at a needle density of 40 needles/cm$^2$ or more, so that the constituent fibers of the mixed fiber web penetrate into the bulky fiber sheet, and are oriented in the thickness direction. On the other hand, when the needle density is too high, the rigidity tends to decrease, and therefore, it may be treated with needles, preferably at a needle density of 100 needles/cm$^2$ or less.

As described above, a unified sheet having the bulky fiber sheet layer and a nonwoven fabric layer can be formed by the action of needles, water jet, or the like from the mixed fiber web side of the laminated fiber sheet, and in the mixed fiber web per se, the fibers are often bonded to each other, for example, entangled with each other by the action of needles, water jet, or the like, and therefore, in the unified sheet after the unification, the layer derived from the mixed fiber web is referred to as a nonwoven fabric layer.

Next, the step (3) of washing the unified sheet to form a washed sheet from which an oil agent is removed, is carried out. By carrying out this step, triboelectric charging efficiently occurs by deforming the washed sheet in the thickness direction, as described below. Since the oil agent is removed after the formation of the unified sheet, fibers with the oil agent may be used to form the mixed fiber web, and the opening properties of fibers are excellent, in comparison with the case where the mixed fiber web is formed using fibers from which the oil agent is removed, and as a result, not only can it contribute to production stability, but it also has an effect that the device configuration can be simplified, for example, it is not necessary to locate a static eliminator or the like for an opening machine.

The method of washing the unified sheet is not particularly limited, but the oil agent can be removed to form a washed sheet by washing the unified sheet with, for example, an alkaline aqueous solution, an alcohol, water (including warm water and hot water), or a mixed solvent thereof. In connection with this, the unified sheet may be washed with the solvent(s) twice or more. In this case, the same solvent may be used, or different solvents may be used.

The step (4) of deforming the washed sheet in the thickness direction, and charging the nonwoven fabric layer by friction, to form a filtration material comprising a bulky fiber sheet layer and a triboelectrically-charged nonwoven fabric layer, can be carried out to produce the filtration material of the present invention. That is to say, the washed sheet has the bulky fiber sheet layer, and since the bulky fiber sheet layer is easily deformed in the thickness direction due to its bulkiness, when the washed sheet is deformed in the thickness direction, the bulky fiber sheet layer is deformed. Since two or more types of fibers different in constituent resin, which constitute the nonwoven fabric layer, penetrate into the bulky fiber sheet layer, when the bulky fiber sheet layer is deformed, the penetrating constituent fibers of the nonwoven fabric are charged by friction between the fibers, to produce the filtration material having the triboelectrically-charged nonwoven fabric layer and the bulky fiber sheet layer.

The method of deforming the washed sheet in the thickness direction is not particularly limited, so long as the constituent fibers of the nonwoven fabric layer are charged by friction. For example, a method of passing it through a gap narrower than the thickness of the washed sheet, a method of rapidly changing the conveying direction of the washed sheet, or the like, may be exemplified.

Figure 2:
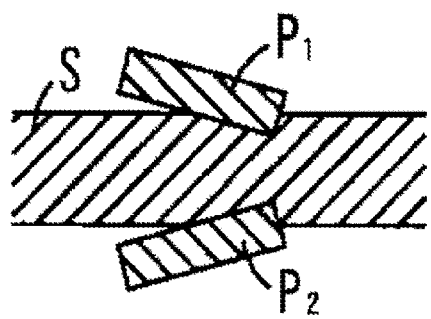
FIG. 2 is another schematic cross-sectional view of an apparatus capable of deforming a washed sheet in the thickness direction.
Figure 3:
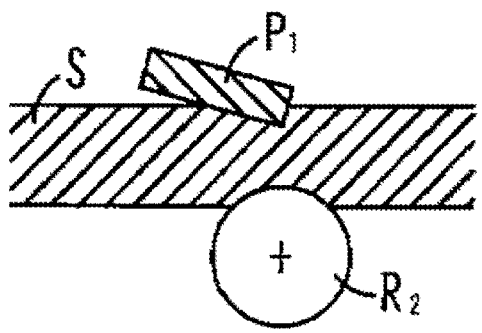
FIG. 3 is still another schematic cross-sectional view of an apparatus capable of deforming a washed sheet in the thickness direction.
Figure 4:
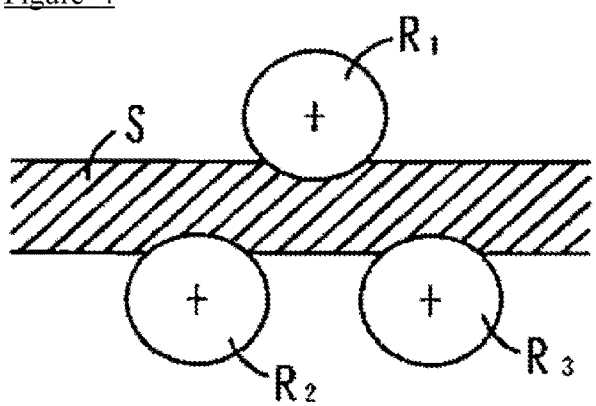
FIG. 4 is still another schematic cross-sectional view of an apparatus capable of deforming a washed sheet in the thickness direction.

More particularly, as the method of passing it through a gap narrower than the thickness of the washed sheet, a method of passing it between a pair of rollers $R_1$ and $R_2$, which are located so as to have a gap narrower than the thickness of washed sheet S, or so as to not have a gap (gauge: 0), as shown in a schematic sectional view of FIG. 1; a method of passing it between a pair of plates $P_1$ and $P_2$, which are located so as to have a gap narrower than the thickness of washed sheet S, or so as to not have a gap, as shown in a schematic sectional view of FIG. 2; a method of passing it between plate $P_1$ and roller $R_2$, which are located so as to have a gap narrower than the thickness of washed sheet S, or so as to not have a gap, as shown in a schematic sectional view of FIG. 3; and a method of passing it between rollers $R_1$ and $R_2$, and between rollers $R_2$ and $R_3$, which are located so as to have a gap narrower than the thickness of washed sheet S, or so as to not have a gap, as shown in a schematic sectional view of FIG. 4; or the like, may be exemplified. Among these methods, the methods using rollers alone, as shown in FIGS. 1 and 4, are preferable, because it is difficult to damage the washed sheet.

The gap formed by these rollers $R_1$-$R_2$ or the like is not particularly limited, so long as it is narrower than the thickness of the washed sheet, but it is preferably 0.1 mm or less.

The surfaces of rollers $R_1$-$R_3$ or plates $P_1$-$P_2$ are preferably smooth surfaces without unevenness, so that the entire bulky fiber sheet layer of the washed sheet can be deformed in the thickness direction. Further, it is preferable that a roller with many needles on the surface is used as the roller at the nonwoven fabric layer side, because, in addition to the deformation of the bulky fiber sheet layer in the thickness direction, the needles penetrate into the nonwoven fabric layer, and efficiently move the constituent fibers of the nonwoven fabric layer, and the fibers rub each other, and as a result, the triboelectrically-charged nonwoven fabric layer, in which the amount of electrical charge is large, can be easily formed.

Further, the present invention is not limited to an embodiment in which a set of such a device capable of deforming the washed sheet in the thickness direction is provided, and it is preferable that triboelectric charging occurs using two or more sets of the device, in order to increase the amount of electrical charge. In the case where two or more sets of triboelectric charging devices are used, it is not necessary that they are the same. Further, in the case where two or more sets of triboelectric charging devices are used, it is preferable that a triboelectric charging device having a narrower gap is provided, as a triboelectric charging device located on the downstream side in the conveying direction, because the amount of triboelectric charge becomes large.

Further, since when rollers $R_1$-$R_3$ and/or plates $P_1$-$P_2$ are made of an insulator having a volume resistivity of $10^{12}$ or more, electrical charging occurs by friction between rollers $R_1$-$R_3$ and/or plates $P_1$-$P_2$ and the washed sheet, it is preferable that rollers $R_1$-$R_3$ and/or plates $P_1$-$P_2$ are made of such an insulator.

Figure 5:
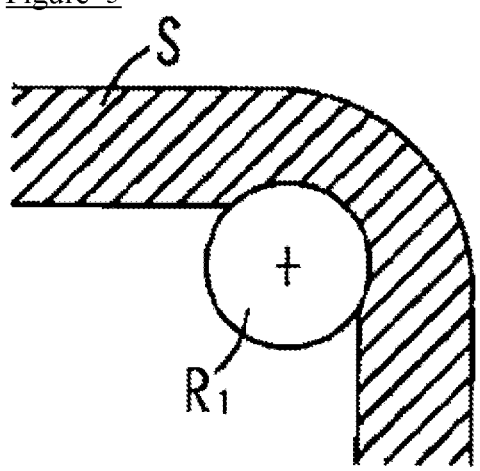
FIG. 5 is still another schematic cross-sectional view of an apparatus capable of deforming a washed sheet in the thickness direction.

On the other hand, as the method of rapidly changing the conveying direction of the washed sheet, a method of deforming the washed sheet in the thickness direction of the washed sheet by changing the conveying direction of the washed sheet by 90° along roller $R_1$, as shown in a schematic sectional view of FIG. 5; and a method of deforming the washed sheet in the thickness direction of the washed sheet by changing the conveying direction of the washed sheet by 90° along a plate, instead of roller $R_1$ of FIG. 5 (not shown); may be exemplified.

Although, in FIG. 5, triboelectric charging occurs by changing the conveying direction of the washed sheet by 90°, the change is not limited to 90°, so long as triboelectric charging occurs. The change is preferably a change capable of triboelectrical charging, by changing the conveying direction, and by deforming the washed sheet to a thickness of 50% or less of an apparent thickness of the washed sheet before the change of the conveying direction (i.e., a thickness under no load).

The surface of the roller or the like, which acts as a fulcrum for changing the conveying direction, is preferably a smooth surface without unevenness, so that the entire bulky fiber sheet layer of the washed sheet can be deformed in the thickness direction. Further, it is preferable that a roller with many needles on the surface is used, as the roller or the like acting as the fulcrum, and is brought into contact with the nonwoven fabric layer of the washed sheet, because, in addition to the deformation of the bulky fiber sheet layer in the thickness direction, the needles penetrate into the nonwoven fabric layer, and efficiently move the constituent fibers of the nonwoven fabric layer, and the fibers rub each other, and as a result, the triboelectrically-charged nonwoven fabric layer, in which the amount of electrical charge is large, can be easily formed.

Further, the present invention is not limited to an embodiment in which a set of such a device capable of deforming the washed sheet in the thickness direction by rapidly changing the conveying direction is provided, and it is preferable that triboelectric charging occurs using two or more sets of the device, in order to increase the amount of electrical charge. In the case where two or more sets of triboelectric charging devices are used, it is not necessary that both devices are ones capable of rapidly changing the conveying direction, and may be used together with the above-mentioned device capable of passing it through a gap narrower than the thickness of the washed sheet. In the case where two or more sets of devices capable of rapidly changing the conveying direction are used, it is preferable that a triboelectric charging device in which the deformation amount in the thickness direction is larger is provided, as a triboelectric charging device located on the downstream side in the conveying direction, because the amount of triboelectric charge becomes large.

Further, since when the roller or the like, which acts as a fulcrum for changing the conveying direction, is made of an insulator having a volume resistivity of $10^{12}$ or more, electrical charging occurs by friction between the roller or the like and the washed sheet, it is preferable that the roller or the like acting as the fulcrum is made of such an insulator.

The above is the basic production method of the filtration material of the present invention, but, as described above, since the filtration material in which the bulky fiber sheet layer is made of the fiber-fused nonwoven fabric is preferable, it is preferable that the fiber web (fiber web for bulky) containing fusible fibers (hereinafter sometimes referred to as "fusible fibers for bulky") is used as the bulky fiber sheet, and after the formation of the unified sheet and before the charging of the nonwoven fabric layer by friction to obtain the triboelectrically-charged nonwoven fabric layer, the fusible fibers for bulky are fused to form the fiber-fused nonwoven fabric layer (bulky fiber sheet layer). This is because, if the fusible fibers for bulky are fused before the formation of the unified sheet, the entanglement between the constituent fibers of the mixed fiber web and the constituent fibers of the bulky fiber sheet is weak when the constituent fibers of the mixed fiber web penetrate into the bulky fiber sheet, and therefore, there is a tendency that the fibers are unlikely to be charged when the washed sheet is deformed, and further, there is a tendency that delamination between the nonwoven fabric layer and the bulky fiber sheet layer easily occurs. On the other hand, this is because, if the fusible fibers for bulky are fused after the charging of the nonwoven fabric layer by friction to obtain the triboelectrically-charged nonwoven fabric layer, there is a tendency that the amount of electrical charge becomes small due to the heat at the time of fusing. In particular, it is preferable that the fusible fibers for bulky are fused at the stage of the unified sheet before washing, because when the unified sheet is washed, it can endure the load by washing, and can easily maintain its shape.

In the method of fusing the fusible fibers for bulky to form the fiber-fused nonwoven fabric layer (bulky fiber sheet layer), since the conditions for fusion vary depending on the fusible fibers for bulky, the method is not particularly limited, so long as the fusible fibers for bulky are fused, and the fiber-fused nonwoven fabric layer (bulky fiber sheet layer) having a thickness of 0.5 mm or more is formed. The conditions can be experimentally and appropriately determined in accordance with the fusible fibers for bulky. The heat treatment can be carried out using, for example, a hot air dryer, an infrared lamp, heating rolls, or the like, but a heating means that does not impart a pressure caused by a solid, such as a hot air dryer, an infrared lamp, or the like, is preferable, because the bulkiness of the fiber-fused nonwoven fabric layer is not damaged.

As described above, it is preferable that the fusible fibers for a charged layer are contained, as the constituent fibers of the triboelectrically-charged nonwoven fabric layer, and are fused, so that the triboelectrically-charged nonwoven fabric layer has a high rigidity and good fuzzing-preventing properties, and therefore, it is preferable that, after the formation of the unified sheet using the mixed fiber web containing the fusible fibers for a charged layer, and before the charging of the nonwoven fabric layer by friction to obtain the triboelectrically-charged nonwoven fabric layer, the fusible fibers for a charged layer are fused to form the nonwoven fabric layer. This is because, if the fusible fibers for a charged layer are fused before the formation of the unified sheet, the fusion between the fusible fibers for a charged layer is destroyed when the unified sheet of the charged-layer fibers and the bulky-layer fibers is formed, and as a result, there is a tendency that the effect is reduced. On the other hand, if the fusible fibers for a charged layer are fused after the charging of the nonwoven fabric layer by friction to obtain the triboelectrically-charged nonwoven fabric layer, there is a tendency that the amount of electrical charge becomes small due to the heat at the time of fusing. In particular, it is preferable that the fusible fibers for a charged layer are fused at the stage of the unified sheet before washing, because when the unified sheet is washed, it can endure the load by washing, and can easily maintain its shape.

In the method of fusing the fusible fibers for a charged layer to form the nonwoven fabric layer, since the conditions for fusion vary depending on the fusible fibers for a charged layer, the method is not particularly limited, so long as the fusible fibers for a charged layer are fused. The conditions can be experimentally and appropriately determined in accordance with the fusible fibers for a charged layer. The heat treatment can be carried out using, for example, a hot air dryer, an infrared lamp, heating rolls, or the like, but a heating means that does not impart a pressure caused by a solid, such as a hot air dryer, an infrared lamp, or the like, is preferable, because the bulkiness of the nonwoven fabric layer is not damaged, and as a result, the bulky, triboelectrically-charged nonwoven fabric layer can be formed, and electrical charging by the deformation of the triboelectrically-charged nonwoven fabric layer can be easily utilized.

As described above, even in either the case where the fiber web for bulky contains the fusible fibers for bulky, or the case where the mixed fiber web contains the fusible fibers for a charged layer, it is preferable that, after the formation of the unified sheet, and before the charging of the nonwoven fabric layer by friction, the fusible fibers for bulky and/or the fusible fibers for a charged layer are fused, and therefore, in the case where both the fusible fibers for bulky and the fusible fibers for a charged layer are contained, it is preferable that the fibers are simultaneously fused, from the viewpoint of the producing process of the filtration material. Therefore, it is preferable that the fusible fibers for bulky and the fusible fibers for a charged layer are the same, because the temperature setting is easy. However, it is not necessary that the fusible fibers for bulky and the fusible fibers for a charged layer are the same.

Since the three-layer filtration material of the present invention has two bulky fiber sheet layers having a thickness of 0.5 mm or more, it has a high rigidity, and during transportation of the three-layer filtration material, during processing of the three-layer filtration material, or when using the three-layer filtration material, by deforming (in particular, deforming in the thickness direction) the bulky fiber sheet layers, the constituent fibers of the triboelectrically-charged nonwoven fabric layer, which penetrate into the bulky fiber sheet layers, are easily charged by friction between the fibers, and therefore, it is a three-layer filtration material in which the amount of electrical charge is unlikely to decrease, and a decline in filtering efficiency is unlikely to occur.

As described above, the thickness of each bulky fiber sheet layer is 0.5 mm or more so that it has a high rigidity and a good deformability. Since the thicker the thickness is, the better these effects are, the thickness is preferably 0.6 mm or more, more preferably 0.7 mm or more, still more preferably 0.8 mm or more, and still more preferably 1 mm or more. On the other hand, if the thickness is more than 100 mm, form stability tends to be poor, and excessive thickness results in reduced versatility, and therefore, the thickness is preferably 100 mm or less, more preferably 50 mm or less, still more preferably 30 mm or less, still more preferably 10 mm or less, and still more preferably 5 mm or less. The "thickness" as used herein, in the three-layer filtration material consisting of two bulky fiber sheet layers and a triboelectrically-charged nonwoven fabric layer, wherein the triboelectrically-charged nonwoven fabric layer is sandwiched between the bulky fiber sheet layers, means a thickness measured at a load of 0.098 kPa.

The bulky fiber sheet layers are not particularly limited, so long as they have an appropriate rigidity and an appropriate deformability. Examples of the bulky fiber sheet layers include a nonwoven fabric to which one bonding means or two or more bonding means, such as fiber fusing, needle punching, water entanglement, binder bonding, or the like, are applied. Among these, a fiber-fused nonwoven fabric or a binder-bonded nonwoven fabric is preferable, because they are superior in rigidity and deformability, and in particular, a fiber-fused nonwoven fabric is more preferable, because the entire fiber surface can contribute to filtration.

In the present invention, each bulky fiber sheet layer contains fibers having a limiting oxygen index of 20 or more, as constituent fibers, so that, even if the triboelectrically-charged nonwoven fabric layer as described below is mainly composed of flammable fibers, flame-resistance can be imparted to the three-layer filtration material, by sandwiching the triboelectrically-charged nonwoven fabric layer between two bulky fiber sheet layers. Since the larger the amount of fibers having a limiting oxygen index of 20 or more is, the better the flame-resistance is, the fibers having a limiting oxygen index of 20 or more account for preferably 70 mass % or more, more preferably 80 mass % or more, still more preferably 90 mass % or more, and still more preferably 100 mass %, in each bulky fiber sheet layer. The "limiting oxygen index" as used herein means a value measured in accordance with JIS K 7201.

More particularly, examples of fibers having a limiting oxygen index of 20 or more include: synthetic fibers, such as polyester fibers, polyamide fibers, vinylon fibers, polyvinylidene chloride fibers, or polyvinyl chloride fibers; inorganic fibers, such as glass fibers; animal fibers, such as wool or silk; and the like. Among these, synthetic fibers are preferable, because the amount of electrical charge of the triboelectrically-charged nonwoven fabric layer, as described below, can be easily maintained and improved by friction between the synthetic fibers and the constituent fibers of the triboelectrically-charged nonwoven fabric layer. Among these synthetic fibers, polyester fibers are preferable, because they have a high rigidity.

Examples of fibers having a limiting oxygen index less than 20, which may constitute the bulky fiber sheet layers, include: synthetic fibers, such as acrylic fibers or polyolefin fibers; regenerated fibers, such as rayon fibers; semi-synthetic fibers, such as acetate fibers; plant fibers, such as cotton or hemp; and the like.

It is preferable that the bulky fiber sheet layers are made of the fiber-fused nonwoven fabric, as described above, and it is preferable that the fiber-fused nonwoven fabric contains fusible fibers having a fusible resin on the fiber surface, and the fusible fibers are fused. The fusible fibers are also preferably the fibers having a limiting oxygen index of 20 or more, for example, fusible fibers having a polyester-based resin, a polyamide-based resin, a polyvinylidene chloride-based resin, or a polyvinyl chloride-based resin, on the fiber surface. Polyester fibers having a high rigidity are preferable, as described above, and therefore, fusible fibers having a polyester-based resin on the fiber surface are preferable.

The fusible fiber is not particularly limited, so long as it has one or more resins as described above on the fiber surface. The fusible fiber may be made of one kind of resin, but it is preferable that the fusible fiber is made of two or more resins including resin(s) not involved in fusion, in addition to the resin(s) on the fiber surface involved in fusion, so that a fiber-fused nonwoven fabric (i.e., a bulky fiber sheet layer) that can maintain the fiber form and has a high rigidity, even after fusion, can be provided. For example, in the case where the fusible fiber is made of two kinds of resins, examples of the fusible fiber include a core-sheath type fusible fiber, in which a resin having a high melting point is coated with a resin having a low melting point, and a side-by-side type fusible fiber, in which a resin having a high melting point is bonded to a resin having a low melting point. In particular, the core-sheath type fusible fiber is preferable, because a bulky fiber sheet layer having a high rigidity can be provided.

As the fusible fiber, a fusible fiber having a polyester-based resin on the fiber surface is preferable, as described above, and therefore, the combination of resins is preferably polyethylene terephthalate/copolymerized polyester, polyethylene terephthalate/polybutylene terephthalate, or polyethylene terephthalate/polytrimethylene terephthalate, and in particular, the combination of resins is preferably (a core component)/(a sheath component).

The fineness of the fibers that constitute the bulky fiber sheet layers is not particularly limited, but each bulky fiber sheet layer contains preferably fibers having a fineness of 15 dtex or more, more preferably fibers having a fineness of 18 dtex or more, and still more preferably fibers having a fineness of 20 dtex or more, so that the rigidity of the three-layer filtration material becomes high by the bulky fiber sheet layers. On the other hand, because if the fineness is too high, the mechanical filtering efficiency tends to decrease, it is preferable that the fineness is 50 dtex or less. Since the more the fibers having a fineness of 15 dtex or more are contained, the higher the rigidity of the three-layer filtration material becomes, the content of the fibers in each bulky fiber sheet layer is preferably 30 mass % or more, more preferably 45 mass % or more, and still more preferably 65 mass % or more. On the other hand, from the viewpoint of improving the mechanical filtering efficiency, each bulky fiber sheet layer also contains preferably fibers having a fineness of less than 15 dtex, more preferably fibers having a fineness of 12 dtex or less, still more preferably fibers having a fineness of 10 dtex or less, and still more preferably fibers having a fineness of 8 dtex or less.

The fiber length of the fibers that constitute the bulky fiber sheet layers is not particularly limited, but it is preferably 30 mm or more, more preferably 40 mm or more, and still more preferably 50 mm or more, so that the rigidity of the three-layer filtration material becomes high by the bulky fiber sheet layers. On the other hand, if the fiber length is too long, there is a tendency that it becomes difficult to uniformly disperse the fibers, and as a result, the filtering efficiency tends to decrease, and therefore, the fiber length is preferably 150 mm or less, and more preferably 110 mm or less.

Each bulky fiber sheet layer has a mass per unit area 0.5 times or more than that of the triboelectrically-charged nonwoven fabric layer as described below so that it can impart flame-resistance to the three-layer filtration material. Since flame-resistance is superior when the mass per unit area of the bulky fiber sheet layer is high, i.e., when the amount of the fibers having a limiting oxygen index of 20 or more is large, each bulky fiber sheet layer has a mass per unit area, preferably 0.6 times or more, more preferably 0.7 times or more, still more preferably 0.8 times or more, still more preferably 0.9 times or more, and still more preferably 1 time or more, than that of the triboelectrically-charged nonwoven fabric layer. On the other hand, since when the mass per unit area of each bulky fiber sheet layer is too high, there is a tendency that versatility is poor (for example, a pleat cannot be easily formed due to a thick thickness), each bulky fiber sheet layer has a mass per unit area, preferably 4 times or less, and more preferably 3 times or less, than that of the triboelectrically-charged nonwoven fabric layer. The "mass per unit area" as used herein means a mass per 1 m$^2$, and a value obtained by a method defined in JIS L 1085:1998 6.2, "Mass per unit area".

The apparent density of each bulky fiber sheet layer is not particularly limited, so long as the thickness is 0.5 mm or more, but it is preferably 0.02-0.10 g/cm$^3$, more preferably 0.04-0.08 g/cm$^3$, and still more preferably 0.05-0.07 g/cm$^3$, so that it is easily deformed.

Although the three-layer filtration material of the present invention has two bulky fiber sheet layers, these bulky fiber sheet layers may be the same, or different from each other in at least one selected from resin composition, fineness, or fiber length of the fibers having a limiting oxygen index of 20 or more; or structure, fiber blending, mass per unit area, thickness, or apparent density of the bulky fiber sheet layer.

The three-layer filtration material of the present invention comprises, in addition to the bulky fiber sheet layers, as described above, a triboelectrically-charged nonwoven fabric layer, in which two or more types of fibers different in constituent resin are mixed. Since the constituent fibers of the triboelectrically-charged nonwoven fabric layer penetrate into the bulky fiber sheet layers, it is a three-layer filtration material in which the amount of electrical charge is unlikely to decrease, and a decline in filtering efficiency is unlikely to occur. That is to say, during transportation of the three-layer filtration material of the present invention, during processing of the three-layer filtration material, or when using the three-layer filtration material, the bulky fiber sheet layers are likely to be deformed, and when the bulky fiber sheet layers are deformed, the penetrating constituent fibers of the triboelectrically-charged nonwoven fabric layer are easily charged by friction between the fibers, and therefore, it is a three-layer filtration material in which the amount of electrical charge is unlikely to decrease, and a decline in filtering efficiency is unlikely to occur.

The triboelectrically-charged nonwoven fabric layer of the present invention is made of a nonwoven fabric, in which two or more types of fibers different in constituent resin are mixed, and the nonwoven fabric is charged by friction. Its constituent fibers can be triboelectrically-charged, so long as the constituent resins are different from each other, but it is preferable that fibers in which the triboelectric series of the resins are apart from each other are mixed, so that the amount of electrical charge is sufficient. Examples of such a combination include a combination of a polyolefin-based fiber with an acrylic-based fiber; a combination of a fluorine-based fiber with a polyamide fiber, wool, a glass fiber, silk, or a rayon fiber; a combination of a urethane fiber with a polyamide fiber, wool, a glass fiber, silk, or a rayon fiber; a combination of a polyvinyl chloride fiber with a polyamide fiber, wool, a glass fiber, silk, or a rayon fiber; a combination of a polyolefin-based fiber with a polyamide fiber, wool, a glass fiber, silk, or a rayon fiber; a combination of an acrylic fiber with a polyamide fiber, wool, a glass fiber, silk, or a rayon fiber; a combination of a vinylon fiber with a polyamide fiber, wool, a glass fiber, silk, or a rayon fiber; a combination of a polyester fiber with a polyamide fiber, wool, a glass fiber, silk, or a rayon fiber; a combination of an acetate fiber with a polyamide fiber, wool, a glass fiber, silk, or a rayon fiber; and the like. Among these, the combination of a polyolefin-based fiber with an acrylic-based fiber is preferable, because the amount of electrical charge is large.

As described above, the constituent fibers of the triboelectrically-charged nonwoven fabric layer is preferably the combination of a polyolefin-based fiber and an acrylic-based fiber. Examples of the constituent resin of the polyolefin-based fiber include a polypropylene resin, a polyethylene resin, a polystyrene resin, a vinyl acetate copolymer resin, an ethylene-propylene copolymer, or a resin prepared by substituting a cyano group or a halogen for part of these resins. The polyolefin-based fiber may be made of one kind of these constituent resins, or may be a composite fiber consisting of two or more kinds of these constituent resins. For example, it may be a core-sheath type composite fiber, and may be a polyolefin-based fiber in which the sheath component is a polyolefin-based resin.

In the case of a polyolefin-based fiber, which is preferable, it is preferable that it contains a phosphorus-based additive and a sulfur-based additive, because the initial filtering efficiency is improved by containing the phosphorus-based additive and the sulfur-based additive. In addition to the phosphorus-based additive and the sulfur-based additive, other additives, such as a phenol-based additive, an amine-based additive, or the like, may be further contained.

The content of the phosphorus-based additive in the polyolefin-based fiber is preferably 0.01 mass % or more, more preferably 0.2 mass % or more, still more preferably 0.3 mass % or more, and still more preferably 0.6 mass % or more.

Examples of the phosphorus-based additive include phosphorus-based antioxidants, such as tris(nonylphenyl) phosphite; tris(2,4-di-t-butylphenyl) phosphite; distearyl pentaerythritol diphosphite; bis(2,4-di-t-butylphenyl) pentaerythritol phosphite; bis(2,6-di-t-butyl-4-methylphenyl) pentaerythritol phosphite; 2,2-methylenebis(4,6-di-t-butylphenyl)octyl phosphite; tetrakis(2,4-di-t-butylphenyl)-4,4'-biphenylene di-phosphonite; phosphorous acid, bis(2,4-bis(1,1-dimethylethyl)-6-methylphenyl) ethyl ester; tetrakis (2,4-di-t-butylphenyl)(1,1-biphenyl)-4,4'-diylbisphosphonite; bis(bis(2,4-di-t-butyl-5-methylphenoxy)phosphino); or the like.

As the sulfur-based additive, for example, sulfur-based antioxidants, such as dilauryl-3,3'-thiodipropionate, dimyristyl-3,3'-thiodipropionate, distearyl-3,3'-thiodipropionate, pentaerythritol tetrakis, or the like, may be preferably used. The content of the sulfur-based additive in the polyolefin-based fiber is preferably 0.01 mass % or more, and more preferably 0.1 mass % or more.

Since when the total content of the phosphorus-based additive and the sulfur-based additive is high, spinnability tends to be poor, the total content of the phosphorus-based additive and the sulfur-based additive with respect to the polyolefin-based fibers is preferably 5 mass % or less, more preferably 2 mass % or less, and still more preferably 1 mass % or less.

On the other hand, as the acrylic fiber, either a polyacrylonitrile-based fiber containing acrlylonitrile as the main component (85% or more) or a modacrylic fiber containing acrylonitrile at a content of 35% or more and less than 85% may be used. Polyacrylonitrile-based fibers include two types, i.e., a fiber spun using an organic solvent and a fiber spun using an inorganic solvent, and either of them may be used.

It is preferable that fusible fibers are contained as the constituent fibers of the triboelectrically-charged nonwoven fabric layer, because when the three-layer filtration material contains fusible fibers as the constituent fibers of the triboelectrically-charged nonwoven fabric layer, and the fusible fibers are fused, the three-layer filtration material has a high rigidity.

Such fusible fibers may be the same fusible fibers as those that can constitute the bulky fiber sheet layers. That is to say, fusible fibers having, for example, a polyester-based resin, a polyamide-based resin, a polyvinylidene chloride-based resin, a polyvinyl chloride-based resin, or a polyolefin resin, on the fiber surface, may be exemplified, and fusible fibers having a polyester-based resin, which has a high rigidity, on the fiber surface, are preferable.

The fusible fiber, which constitutes the triboelectrically-charged nonwoven fabric layer, is not particularly limited, so long as it has one or more resins as described above on the fiber surface. The fusible fiber may be made of one kind of resin, but it is preferable that the fusible fiber is made of two or more resins including resin(s) not involved in fusion, in addition to the resin(s) on the fiber surface involved in fusion, so that a triboelectrically-charged nonwoven fabric layer having a high rigidity can be provided. For example, in the case where the fusible fiber is made of two kinds of resins, examples of the fusible fiber include a core-sheath type fusible fiber, in which a resin having a high melting point is coated with a resin having a low melting point, and a side-by-side type fusible fiber, in which a resin having a high melting point is bonded to a resin having a low melting point. In particular, the core-sheath type fusible fiber is preferable, because a triboelectrically-charged nonwoven fabric layer having a high rigidity can be provided.

A fusible fiber having a polyester-based resin on the fiber surface is preferable, as described above, and therefore, the combination of resins is preferably polyethylene terephthalate/copolymerized polyester, polyethylene terephthalate/polybutylene terephthalate, or polyethylene terephthalate/polytrimethylene terephthalate, and in particular, the combination of resins is preferably (a core component)/(a sheath component).

In the case where either or both of the bulky fiber sheet layers contain the fusible fibers, the fusible fibers that constitute the triboelectrically-charged nonwoven fabric layer may be the same as, or different from those that constitute either or both of the bulky fiber sheet layers, but it is preferable that they are the same, because the bulky fiber sheet layers are firmly fused with the triboelectrically-charged nonwoven fabric layer, and a three-layer filtration material in which delamination is difficult to occur can be provided.

In the triboelectrically-charged nonwoven fabric layer of the present invention, it is preferable that the polyolefin-based fibers and the acrylic fibers are contained, as described above, and in the case where the fusible fibers are contained, the fusible fibers may be contained in addition to the polyolefin-based fibers and the acrylic fibers, or the fusible fibers may be used instead of the acrylic fibers, and the fusible fibers and polyolefin-based fibers may be contained.

The fineness of the fibers that constitute the triboelectrically-charged nonwoven fabric layer is not particularly limited, but it is preferably 10 dtex or less, more preferably 7 dtex or less, still more preferably 5 dtex or less, and still more preferably 3 dtex or less, because when the surface area of the fiber is large, fibers are easily rubbed, and the amount of electrical charge becomes large, and therefore, improvement in filtration efficiency due to charging can be expected. On the other hand, when the fibers become too thin, there is a tendency that pressure drop easily increases, and therefore, the fineness is preferably 0.1 dtex or more, more preferably 0.5 dtex or more, and still more preferably 1 dtex or more.

The fiber length of the fibers that constitute the triboelectrically-charged nonwoven fabric layer is not particularly limited, but it is preferably 20 mm or more, more preferably 35 mm or more, and still more preferably 50 mm or more, so that the fibers penetrate into the bulky fiber sheet layers, and it becomes a state where triboelectric charging easily occurs, when the bulky fiber sheet layer is deformed. On the other hand, if the fiber length is too long, there is a tendency that it becomes difficult to uniformly disperse the fibers, and as a result, the filtering efficiency tends to decrease, and therefore, the fiber length is preferably 150 mm or less, and more preferably 110 mm or less.

The triboelectrically-charged nonwoven fabric layer in the present invention is a layer in which two or more types of fibers different in constituent resin are mixed. The mixing ratio of the fibers different in constituent resin varies depending on the combination of the fibers, and therefore, is not particularly limited, so long as triboelectric charging efficiently occurs. The ratio of the number of positively-charged fibers to the number of negatively-charged fibers is preferably 1:0.5-2, more preferably 1:0.75-1.5, and still more preferably 1:0.8-1.2, so that the constituent fibers are easily charged by friction between the fibers. For example, in the case where polyolefin-based fibers (fineness: 2.2 dtex, fiber length: 51 mm, density: 0.9 g/cm$^3$) and acrylic-based fibers (fineness: 2.2 dtex, fiber length: 51 mm, density: 1.14 g/cm$^3$) are mixed, as a preferred embodiment, the mass ratio of the polyolefin-based fibers to the acrylic-based fibers is preferably about 39:61-72:28, more preferably about 46:54-63:37, and still more preferably about 51:49-62:38.

Even when the triboelectrically-charged nonwoven fabric layer contains fusible fibers, it is preferably that the fusible fibers are mixed so that the ratio of the number of positively-charged fibers to the number of negatively-charged fibers is within the above-mentioned range, because the constituent fibers are easily charged by friction between the fibers. In general, in order to increase the rigidity of the triboelectrically-charged nonwoven fabric layer, the fusible fibers account for preferably 15 mass % or more, and more preferably 20 mass % or more of the triboelectrically-charged nonwoven fabric layer. On the other hand, when the amount of the fusible fibers becomes large, the amount of fibers that contribute to triboelectric charging becomes small, and there is a tendency that it cannot be sufficiently charged, and therefore, the fusible fibers account for preferably 60 mass % or less, more preferably 50 mass % or less, and still more preferably 40 mass % or less of the triboelectrically-charged nonwoven fabric layer.

The mass per unit area of the triboelectrically-charged nonwoven fabric layer is not particularly limited, but since it is preferable that the layer contains a certain amount of fibers so that the amount of electrical charge becomes large, it is preferably 20 g/m$^2$ or more, more preferably 30 g/m$^2$ or more, and still more preferably 40 g/m$^2$ or more. On the other hand, since when the mass per unit area is too large, there is a tendency that pressure drop becomes high, it is preferably 200 g/m$^2$ or less, more preferably 180 g/m$^2$ or less, and still more preferably 150 g/m$^2$ or less. In particular, the amount of fibers that contribute to triboelectric charging in the triboelectrically-charged nonwoven fabric layer is preferably 20 g/m$^2$ or more, more preferably 30 g/m$^2$ or more, still more preferably 35 g/m$^2$ or more, still more preferably 40 g/m$^2$ or more, and still more preferably 45 g/m$^2$ or more, so that the amount of electrical charge becomes large. On the other hand, the amount of fibers that contribute to triboelectric charging in the triboelectrically-charged nonwoven fabric layer is preferably 200 g/m$^2$ or less, more preferably 180 g/m$^2$ or less, and still more preferably 150 g/m$^2$ or less, so that pressure drop is unlikely to increase.

The thickness of the triboelectrically-charged nonwoven fabric layer is not particularly limited, but it is preferably 0.3 mm or more, more preferably 0.5 mm or more, still more preferably 0.7 mm or more, and still more preferably 1 mm or more, so that not only the bulky fiber sheet layers, but also the triboelectrically-charged nonwoven fabric layer per se is deformed in the thickness direction, and as a result, the constituent fibers of the triboelectrically-charged nonwoven fabric layer, which do not penetrate into the bulky fiber sheet layer, are charged by friction between the fibers, and the amount of electrical charge becomes easily large. On the other hand, the thickness is preferably 3 mm or less, so that it is a three-layer filtration material having a good form stability and a good versatility.

The apparent density of the triboelectrically-charged nonwoven fabric layer is not particularly limited, but it is preferably 0.02 to 0.20 g/cm$^3$, and more preferably 0.05 to 0.10 g/cm$^3$, so that there exists a certain amount of fibers, and it has flexibility to be charged by friction between the fibers.

The fibers that constitute the triboelectrically-charged nonwoven fabric layer penetrate into the bulky fiber sheet layers, and the fibers are charged by friction when the bulky fiber sheet layers are deformed (in particular, in the thickness direction), and therefore, it is a three-layer filtration material in which the amount of electrical charge is unlikely to decrease, and a decline in filtering efficiency is unlikely to occur. That is to say, like the case where the triboelectrically-charged nonwoven fabric layer and the bulky fiber sheet layers are simply laminated, in the case where the fibers that constitute the triboelectrically-charged nonwoven fabric layer do not penetrate into the bulky fiber sheet layers, even if the bulky fiber sheet layers are deformed, the fibers that constitute the triboelectrically-charged nonwoven fabric layer are unlikely to be charged by friction between the fibers. On the other hand, in the case where the fibers that constitute the triboelectrically-charged nonwoven fabric layer penetrate into the bulky fiber sheet layers, since the fibers that constitute the triboelectrically-charged nonwoven fabric layer are oriented in the thickness direction of the three-layer filtration material, the fibers that constitute the triboelectrically-charged nonwoven fabric layer are easily charged by friction between the fibers, when the bulky fiber sheet layers are deformed.

In connection with this, a three-layer filtration material in which the fibers that constitute the triboelectrically-charged nonwoven fabric layer penetrate into the bulky fiber sheet layers, and the constituent fibers of the triboelectrically-charged nonwoven fabric layer are entangled with the constituent fibers of the bulky fiber sheet layers is a preferred embodiment, because delamination between the triboelectrically-charged nonwoven fabric layer and the bulky fiber sheet layers is difficult to occur.

The constituent fibers that constitute the triboelectrically-charged nonwoven fabric layer may penetrate into either of the bulky fiber sheet layers, or may penetrate into both bulky fiber sheet layers. A three-layer filtration material in which the constituent fibers that constitute the triboelectrically-charged nonwoven fabric layer penetrate into the bulky fiber sheet layers, and/or the constituent fibers of either of the bulky fiber sheet layers penetrate into the triboelectrically-charged nonwoven fabric layer, and the fibers are entangled with each other, is a preferred embodiment, because delamination is difficult to occur.

The mass per unit area of the three-layer filtration material of the present invention is not particularly limited, but it is preferably 40-400 g/m$^2$, more preferably 60-360 g/m$^2$, still more preferably 80-300 g/m$^2$, still more preferably 90-250 g/m$^2$, and still more preferably 100-200 g/m$^2$.

The thickness of the three-layer filtration material is not particularly limited, but it is preferably 1.1-203 mm, more preferably 1.5-50 mm, still more preferably 2-30 mm, still more preferably 2.5-20 mm, still more preferably 3-10 mm, and still more preferably 3-5 mm, so that it is easily deformed in the thickness direction, and the amount of electrical charge becomes easily large.

It is preferable that the three-layer filtration material of the present invention has a certain degree of rigidity, because it is preferable that a filter element is formed in a pleated state so that the filtration area is large, and an increase in pressure drop can be inhibited. More particularly, the bending resistance measured by a Gurley method as defined in JIS L 1913:2010, 6.7.4 is preferably 1 mN or more, more preferably 2.5 mN or more, and still more preferably 4 mN or more. In connection with this, each test piece is cut into a rectangle having a size of 30 mm×40 mm, and the side of 30 mm is fixed to a chuck, and the measurement is carried out.

The filter element of the present invention comprises the three-layer filtration material as described above in a pleated state. Therefore, it has a high rigidity, and the fibers that constitute the triboelectrically-charged nonwoven fabric layer are easily charged by friction between the fibers, and therefore, it is a filter element in which the amount of electrical charge is unlikely to decrease, and a decline in filtering efficiency is unlikely to occur. In connection with this, since the three-layer filtration material of the present invention has a high rigidity, it is a filter element which can be well produced by pleating. Further, since the three-layer filtration material as described above has a good flame-resistance, it is a filter element having a good flame-resistance.

The filter element of the present invention may be the same as the above-mentioned filter element, except that the three-layer filtration material as described above is used.

The three-layer filtration material of the present invention may be produced, for example, by the following method, comprising the steps of:

(1) providing a mixed fiber web in which two or more types of fibers different in constituent resin are mixed,
(2) providing two bulky fiber sheets containing fibers having a limiting oxygen index of 20 or more, said bulky fiber sheets having a thickness of 0.5 mm or more, and a mass per unit area 0.5 times or more than that of the mixed fiber web,
(3) sandwiching the mixed fiber web between the bulky fiber sheets to form a three-layer sheet,
(4) penetrating the constituent fibers of the mixed fiber web into the bulky fiber sheets, to form a unified three-layer sheet in which a mixed nonwoven fabric layer is located between bulky fiber sheet layers,
(5) washing the unified three-layer sheet to form a washed three-layer sheet from which an oil agent is removed, and
(6) deforming the washed three-layer sheet in the thickness direction, and charging the mixed nonwoven fabric layer by friction, to form a three-layer filtration material in which a triboelectrically-charged nonwoven fabric layer is located between the bulky fiber sheet layers. Such a production method is a method in which after the formation of a unified three-layer sheet, an oil agent is removed so as to become a state where triboelectric charging easily occurs, and the washed sheet is deformed in the thickness direction to charge it by friction, and therefore, it can be produced without influence from heat and moisture during the unification of the bulky fiber sheet and the triboelectrically-charged nonwoven fabric. Further, because the washed sheet can be charged by deforming it in the thickness direction when it is conveyed or the like, a three-layer filtration material, in which the amount of electrical charge is unlikely to decrease, and a decline in filtering efficiency is unlikely to occur, can be produced. Furthermore, since two bulky fiber sheets are used, a three-layer filtration material having a high rigidity can be produced. Furthermore, since the mixed fiber web is sandwiched between two bulky fiber sheets containing fibers having a limiting oxygen index of 20 or more, a three-layer filtration material having a good flame-resistance can be produced.

More particularly, first, the step (1) of providing a mixed fiber web in which two or more types of fibers different in constituent resin are mixed, is carried out. The mixed fiber web may be formed, for example, by a dry method, such as a card method, an air-laying method, or the like, using the fibers as described above. Although the triboelectrically-charged nonwoven fabric layer, which constitutes the three-layer filtration material of the present invention, may be made of the fibers as described above, since it preferably contains polyolefin-based fibers and acrylic fibers so that the fibers are easily charged by friction, it is preferable that the mixed fiber web contains the polyolefin-based fibers and the acrylic fibers. Further, in the case where the triboelectrically-charged nonwoven fabric layer contains fusible fibers (hereinafter sometimes referred to as "fusible fibers for a charged layer"), it is preferable that it contains fusible fibers for a charged layer, instead of the polyolefin-based fibers or the acrylic fibers, or in addition to the polyolefin-based fibers and the acrylic fibers.

Next, the step (2) of providing two bulky fiber sheets containing fibers having a limiting oxygen index of 20 or more, said bulky fiber sheets having a thickness of 0.5 mm or more, and a mass per unit area 0.5 times or more than that of the mixed fiber web, is carried out. The bulky fiber sheets may be formed by a dry method, such as a card method, an air-laying method, or the like, using the fibers having a limiting oxygen index of 20 or more, as described above. Since it is preferable that the bulky fiber sheet layers that constitute the three-layer filtration material of the present invention are made of a fiber-fused nonwoven fabric, it is preferable that the bulky fiber sheet are fiber webs containing fusible fibers (hereinafter sometimes referred to as "fiber webs for bulky").

Although two bulky fiber sheets are formed, these bulky fiber sheets may be the same, or different from each other in at least one selected from resin composition, fineness, or fiber length of the fibers having a limiting oxygen index of 20 or more; or production method, fiber blending, mass per unit area, thickness, or apparent density of the bulky fiber sheets.

Next, the step (3) of sandwiching the mixed fiber web between the bulky fiber sheets to form a three-layer sheet, is carried out. A three-layer filtration material having a good rigidity and a good flame-resistance can be produced by sandwiching the mixed fiber web between the bulky fiber sheets.

Next, the step (4) of penetrating the constituent fibers of the mixed fiber web into the bulky fiber sheets, to form a unified three-layer sheet in which a mixed nonwoven fabric layer is located between bulky fiber sheet layers, is carried out. The method of penetrating the constituent fibers of the mixed fiber web into the bulky fiber sheets is not particularly limited, but for example, a method of treating the laminated fiber sheet with needles or water jet, may be exemplified. Among these methods, the method of treating it with needles is preferable, because the constituent fibers of the mixed fiber web are reliably oriented in the thickness direction, in which the constituent fibers of the mixed fiber web are easily charged by friction, and it is difficult to impair the bulkiness of the bulky fiber sheet.

Further, the method of treating it with needles or water jet has characteristics that the constituent fibers of one of the bulky fiber sheets penetrate into the mixed fiber web, and are entangled with each other, and the constituent fibers of the mixed fiber web penetrate into another bulky fiber sheet, and are entangled with each other, and therefore, a three-layer filtration material, in which delamination is difficult to occur, can be produced.

Since when it is treated with needles or water jet not only from the side of one of the bulky fiber sheets, but also from the side of another bulky fiber sheet, the constituent fibers of the mixed fiber web penetrate into both bulky fiber sheets, and are entangled with each other, triboelectric charging easily occurs by deforming both bulky fiber sheets, and delamination is difficult to occur.

The needle conditions, as a preferred embodiment, are not particularly limited, but it may be treated with needles, preferably at a needle density of 30 needles/cm$^2$ or more, and more preferably at a needle density of 40 needles/cm$^2$ or more, so that the constituent fibers of the mixed fiber web penetrate into either of the bulky fiber sheets, and are oriented in the thickness direction. On the other hand, when the needle density is too high, the rigidity of the three-layer filtration material tends to decrease, and therefore, it may be treated with needles, preferably at a needle density of 100 needles/cm$^2$ or less.

In connection with this, in the mixed fiber web per se, the fibers are often bonded to each other, for example, entangled with each other by the action of needles, water jet, or the like, and therefore, in the unified three-layer sheet after the unification, the layer derived from the mixed fiber web is referred to as a mixed nonwoven fabric layer.

Next, the step (5) of washing the unified three-layer sheet to form a washed three-layer sheet from which an oil agent is removed, is carried out. By carrying out this step, triboelectric charging efficiently occurs by deforming the washed three-layer sheet in the thickness direction, as described below. Since the oil agent is removed after the formation of the unified three-layer sheet, fibers with the oil agent may be used to form the mixed fiber web, and the opening properties of fibers are excellent, in comparison with the case where the mixed fiber web is formed using fibers from which the oil agent is removed, and as a result, not only can it contribute to production stability, but it also has an effect that the device configuration can be simplified, for example, it is not necessary to locate a static eliminator or the like for an opening machine.

The method of washing the unified three-layer sheet is not particularly limited, but the oil agent can be removed to form a washed three-layer sheet by washing the unified three-layer sheet with, for example, an alkaline aqueous solution, an alcohol, water (including warm water and hot water), or a mixed solvent thereof. In connection with this, the unified three-layer sheet may be washed with the solvent(s) twice or more. In this case, the same solvent may be used, or different solvents may be used.

The step (6) of deforming the washed three-layer sheet in the thickness direction, and charging the mixed nonwoven fabric layer by friction, to form a three-layer filtration material in which a triboelectrically-charged nonwoven fabric layer is located between the bulky fiber sheet layers, can be carried out to produce the three-layer filtration material of the present invention. That is to say, the washed three-layer sheet has the bulky fiber sheet layers, into which the constituent fibers of the mixed nonwoven fabric layer penetrate, and since the bulky fiber sheet layers are easily deformed in the thickness direction due to its bulkiness, when the washed three-layer sheet is deformed in the thickness direction, the bulky fiber sheet layers are deformed. Since two or more types of fibers different in constituent resin, which constitute the mixed nonwoven fabric layer, penetrate into the bulky fiber sheet layers, when the bulky fiber sheet layers are deformed, the penetrating constituent fibers of the mixed nonwoven fabric are charged by friction between the fibers, to produce the three-layer filtration material having the triboelectrically-charged nonwoven fabric layer between the bulky fiber sheet layers. In connection with this, in the case where the constituent fibers of the mixed nonwoven fabric layer penetrate into both bulky fiber sheets, any constituent fibers of the mixed nonwoven fabric layer, which penetrate into the bulky fiber sheets, are charged by friction.

The method of deforming the washed three-layer sheet in the thickness direction is not particularly limited, so long as the constituent fibers of the mixed nonwoven fabric layer are charged by friction. For example, a method of passing it through a gap narrower than the thickness of the washed three-layer sheet, a method of rapidly changing the conveying direction of the washed three-layer sheet, or the like, may be exemplified.

More particularly, as the method of passing it through a gap narrower than the thickness of the washed three-layer sheet, a method of passing it between a pair of rollers $R_1$ and $R_2$, which are located so as to have a gap narrower than the thickness of washed three-layer sheet S, or so as to not have a gap (gauge: 0), as shown in a schematic sectional view of FIG. 1; a method of passing it between a pair of plates $P_1$ and $P_2$, which are located so as to have a gap narrower than the thickness of washed three-layer sheet S, or so as to not have a gap, as shown in a schematic sectional view of FIG. 2; a method of passing it between plate $P_1$ and roller $R_2$, which are located so as to have a gap narrower than the thickness of washed three-layer sheet S, or so as to not have a gap, as shown in a schematic sectional view of FIG. 3; and a method of passing it between rollers $R_1$ and $R_2$, and between rollers $R_2$ and $R_3$, which are located so as to have a gap narrower than the thickness of washed three-layer sheet S, or so as to not have a gap (gauge: 0), as shown in a schematic sectional view of FIG. 4; or the like, may be exemplified. Among these methods, the methods using rollers alone, as shown in FIGS. 1 and 4, are preferable, because it is difficult to damage the washed three-layer sheet.

The gap formed by these rollers $R_1$-$R_2$ or the like is not particularly limited, so long as it is narrower than the thickness of the washed three-layer sheet, but it is preferably 0.1 mm or less.

The surfaces of rollers $R_1$-$R_3$ or plates $P_1$-$P_2$ are preferably smooth surfaces without unevenness, so that the entire bulky fiber sheet layer of the washed three-layer sheet can be deformed in the thickness direction.

In connection with this, it is preferable that rollers with many needles on the surface are used as rollers $R_1$-$R_3$, because, in addition to the deformation of the bulky fiber sheet layer in the thickness direction, the needles penetrate into the mixed nonwoven fabric layer, and efficiently move the constituent fibers of the mixed nonwoven fabric layer, and the fibers rub each other, and as a result, the triboelectrically-charged nonwoven fabric layer, in which the amount of electrical charge is large, can be easily formed.

Further, the present invention is not limited to an embodiment in which a set of such a device capable of deforming the washed three-layer sheet in the thickness direction is provided, and it is preferable that triboelectric charging occurs using two or more sets of the device, in order to increase the amount of electrical charge. In the case where two or more sets of triboelectric charging devices are used, it is not necessary that they are the same. Further, in the case where two or more sets of triboelectric charging devices are used, it is preferable that a triboelectric charging device having a narrower gap is provided, as a triboelectric charging device located on the downstream side in the conveying direction, because the amount of triboelectric charge becomes large.

Further, since when rollers $R_1$-$R_3$ and/or plates $P_1$-$P_2$ are made of an insulator having a volume resistivity of $10^{12}$ or more, electrical charging occurs by friction between rollers $R_1$-$R_3$ and/or plates $P_1$-$P_2$ and the constituent fibers of the mixed nonwoven fabric layer, which penetrate into the bulky fiber sheet layers, it is preferable that rollers $R_1$-$R_3$ and/or plates $P_1$-$P_2$ are made of such an insulator.

On the other hand, as the method of rapidly changing the conveying direction of the washed three-layer sheet, a method of deforming the washed three-layer sheet in the thickness direction of the washed three-layer sheet by changing the conveying direction of the washed three-layer sheet by 90° along roller $R_1$, as shown in a schematic sectional view of FIG. 5; and a method of deforming the washed three-layer sheet in the thickness direction of the washed three-layer sheet by changing the conveying direction of the washed three-layer sheet by 90° along a plate, instead of roller $R_1$ of FIG. 5 (not shown); may be exemplified.

Although, in FIG. 5, triboelectric charging occurs by changing the conveying direction of the washed three-layer sheet by 90°, the change is not limited to 90°, so long as triboelectric charging occurs. The change is preferably a change capable of triboelectrical charging, by changing the conveying direction, and by deforming the washed three-layer sheet to a thickness of 50% or less of an apparent thickness of the washed three-layer sheet before the change of the conveying direction (i.e., a thickness under no load).

The surface of the roller or the like, which acts as a fulcrum for changing the conveying direction, is preferably a smooth surface without unevenness, so that the entire bulky fiber sheet layer of the washed three-layer sheet can be deformed in the thickness direction. Further, it is preferable that a roller with many needles on the surface is used, as the roller or the like acting as the fulcrum, because, in addition to the deformation of the bulky fiber sheet layer in the thickness direction, the needles penetrate into the mixed nonwoven fabric layer, and efficiently move the constituent fibers of the mixed nonwoven fabric layer, and the fibers rub each other, and as a result, the triboelectrically-charged nonwoven fabric layer, in which the amount of electrical charge is large, can be easily formed.

Further, the present invention is not limited to an embodiment in which a set of such a device capable of deforming the washed three-layer sheet in the thickness direction by rapidly changing the conveying direction is provided, and it is preferable that triboelectric charging occurs using two or more sets of the device, in order to increase the amount of electrical charge. In the case where two or more sets of triboelectric charging devices are used, it is not necessary that both devices are ones capable of rapidly changing the conveying direction, and may be used together with the above-mentioned device capable of passing it through a gap narrower than the thickness of the washed three-layer sheet. In the case where two or more sets of devices capable of rapidly changing the conveying direction are used, it is preferable that a triboelectric charging device in which the deformation amount in the thickness direction is larger is provided, as a triboelectric charging device located on the downstream side in the conveying direction, because the amount of triboelectric charge becomes large.

Further, since when the roller or the like, which acts as a fulcrum for changing the conveying direction, is made of an insulator having a volume resistivity of $10^{12}$ or more, electrical charging occurs by friction between the roller or the like and the constituent fibers of the mixed nonwoven fabric layer, which penetrate into the bulky fiber sheet layers, it is preferable that the roller or the like acting as the fulcrum is made of such an insulator.

The above is the basic production method of the three-layer filtration material of the present invention, but, as described above, since the three-layer filtration material in which the bulky fiber sheet layers are made of the fiber-fused nonwoven fabric layer is preferable, it is preferable that the fiber web (fiber web for bulky) containing fusible fibers (hereinafter sometimes referred to as "fusible fibers for bulky") is used as at least one of the bulky fiber sheets, and after the formation of the unified three-layer sheet and before the charging of the mixed nonwoven fabric layer by friction to obtain the triboelectrically-charged nonwoven fabric layer, the fusible fibers for bulky are fused to form the bulky fiber sheet layer(s) made of a fiber-fused nonwoven fabric layer. This is because, if the fusible fibers for bulky are fused before the formation of the unified three-layer sheet, the entanglement between the constituent fibers of the mixed fiber web and the constituent fibers of the bulky fiber sheets is weak when the constituent fibers of the mixed fiber web penetrate into the bulky fiber sheets, and therefore, there is a tendency that the fibers are unlikely to be charged when the washed three-layer sheet is deformed, and further, there is a tendency that delamination between the mixed nonwoven fabric layer and the bulky fiber sheet layers easily occurs. On the other hand, this is because, if the fusible fibers for bulky are fused after the charging of the mixed nonwoven fabric layer by friction to obtain the triboelectrically-charged nonwoven fabric layer, there is a tendency that the amount of electrical charge becomes small due to the heat at the time of fusing. In particular, it is preferable that the fusible fibers for bulky are fused at the stage of the unified three-layer sheet before washing, because when the unified three-layer sheet is washed, it can endure the load by washing, and can easily maintain its shape.

In the method of fusing the fusible fibers for bulky to form the fiber-fused nonwoven fabric layer (bulky fiber sheet layer), since the conditions for fusion vary depending on the fusible fibers for bulky, the method is not particularly limited, so long as the fusible fibers for bulky are fused, and the fiber-fused nonwoven fabric layer (bulky fiber sheet layer) having a thickness of 0.5 mm or more is formed. The conditions can be experimentally and appropriately determined in accordance with the fusible fibers for bulky. The heat treatment can be carried out using, for example, a hot air dryer, an infrared lamp, heating rolls, or the like, but a heating means that does not impart a pressure caused by a solid, such as a hot air dryer, an infrared lamp, or the like, is preferable, because the bulkiness of the fiber-fused nonwoven fabric layer is not damaged.

In the case where both bulky fiber sheets contain the fusible fibers for bulky, it is preferable that the difference between the melting point of a resin contributing to the fusion of the fusible fibers for bulky that constitute one bulky fiber sheet and the melting point of a resin contributing to the fusion of the fusible fibers for bulky that constitute another bulky fiber sheet is within 10° C., because both fusible fibers for bulky can be simultaneously fused, and it is more preferable that the difference in melting point is 0° C., or the resins that contribute to the fusion are the same.

As described above, it is preferable that the fusible fibers for a charged layer are contained, as the constituent fibers of the triboelectrically-charged nonwoven fabric layer, and are fused, so that the triboelectrically-charged nonwoven fabric layer has a high rigidity, and therefore, in the case where the mixed fiber web contains the fusible fibers for a charged layer, it is preferable that, after the formation of the unified three-layer sheet using the mixed fiber web containing the fusible fibers for a charged layer, and before the charging of the mixed nonwoven fabric layer by friction to obtain the triboelectrically-charged nonwoven fabric layer, the fusible fibers for a charged layer are fused to form the mixed nonwoven fabric layer. This is because, if the fusible fibers for a charged layer are fused before the formation of the unified three-layer sheet, the fusion between the fusible fibers for a charged layer is destroyed when the constituent fibers of the mixed fiber web penetrate into the bulky fiber sheets, and as a result, there is a tendency that the rigidity improvement effect by the fusion of the fusible fibers for a charged layer is reduced. On the other hand, if the fusible fibers for a charged layer are fused after the charging of the mixed nonwoven fabric layer by friction to obtain the triboelectrically-charged nonwoven fabric layer, there is a tendency that the amount of electrical charge becomes small due to the heat at the time of fusing. In particular, it is preferable that the fusible fibers for a charged layer are fused at the stage of the unified three-layer sheet before washing, because when the unified three-layer sheet is washed, it can endure the load by washing, and can easily maintain its shape.

In the method of fusing the fusible fibers for a charged layer to form the mixed nonwoven fabric layer, since the conditions for fusion vary depending on the fusible fibers for a charged layer, the method is not particularly limited, so long as the fusible fibers for a charged layer are fused. The conditions can be experimentally and appropriately determined in accordance with the fusible fibers for a charged layer. The heat treatment can be carried out using, for example, a hot air dryer, an infrared lamp, heating rolls, or the like, but a heating means that does not impart a pressure caused by a solid, such as a hot air dryer, an infrared lamp, or the like, is preferable, because the bulkiness of the mixed nonwoven fabric layer is not damaged, and as a result, the bulky, triboelectrically-charged nonwoven fabric layer can be formed, and electrical charging by the deformation of the triboelectrically-charged nonwoven fabric layer can be easily utilized.

As described above, even in either the case where the fiber web for bulky contains the fusible fibers for bulky, or the case where the mixed fiber web contains the fusible fibers for a charged layer, it is preferable that, after the formation of the unified three-layer sheet, and before the charging of the mixed nonwoven fabric layer by friction, the fusible fibers for bulky and/or the fusible fibers for a charged layer are fused, and therefore, in the case where two or more fusible fibers, which are selected from the fusible fibers for bulky that constitute one fiber web for bulky, the fusible fibers for bulky that constitute another fiber web for bulky, and the fusible fibers for a charged layer, are contained, it is preferable that the fibers are simultaneously fused, from the viewpoint of the producing process of the three-layer filtration material. Therefore, it is preferable that the difference in melting point of resins contributing to the fusion of two or more fusible fibers contained is within 10° C., and it is more preferable that the resins have the same melting point, so that the temperature setting is easy.

EXAMPLES

The present invention now will be further illustrated by, but is by no means limited to, the following Examples.
(Core-Sheath Type Fusible Fiber A)
Core-sheath type fusible fibers A (fineness: 22 dtex, fiber length: 64 mm, limiting oxygen index: 20, Unitika ester T-4080) consisting of polyethylene terephthalate as a core component and copolymerized polyester (melting point: 110° C.) as a sheath component were prepared.
(Core-Sheath Type Fusible Fiber B)
Core-sheath type fusible fibers B (fineness: 6.6 dtex, fiber length: 51 mm, limiting oxygen index: 20, Unitika ester T-4080) consisting of polyethylene terephthalate as a core component and copolymerized polyester (melting point: 110° C.) as a sheath component were prepared.
(Core-Sheath Type Fusible Fiber C)

Core-sheath type fusible fibers C (fineness: 17 dtex, fiber length: 51 mm, limiting oxygen index: 20, manufactured by HUVIS, product name: LMF) consisting of polyethylene terephthalate as a core component and copolymerized polyester (melting point: 110° C.) as a sheath component were prepared.
(Core-Sheath Type Fusible Fiber D)

Core-sheath type fusible fibers D (fineness: 6 dtex, fiber length: 51 mm, limiting oxygen index: 20, manufactured by HUVIS, product name: LMF) consisting of polyethylene terephthalate as a core component and copolymerized polyester (melting point: 110° C.) as a sheath component were prepared.
(Acrylic Fiber)

Polyacrylonitrile-based acrylic fibers prepared by wet-spinning a spinning solution dissolved in an organic solvent [Vonnel (registered trademark) H815, fineness: 2.2 dtex, fiber length: 51 mm, limiting oxygen index: 18, manufactured by Mitsubishi Rayon Co., Ltd., density: 1.15 g/cm$^3$] were prepared as acrylic fibers.
(Polypropylene Fiber)

Ube-Nitto PP-NM (fineness: 2.2 dtex, fiber length: 51 mm, limiting oxygen index: 18, manufactured by Ube-Nitto Kasei Co., Ltd., density: 0.89 g/cm$^3$) was prepared as polypropylene fibers.
(Spunbond Nonwoven Fabric)

A polyester spunbond nonwoven fabric, Marix (registered trademark, manufactured by Unitika Ltd., mass per unit area: 20 g/m$^2$, thickness: 0.14 mm), was prepared as a spunbond nonwoven fabric.

Example 1

(1) A fiber web for bulky (mass per unit area: 100 g/m$^2$, thickness: 2.0 mm) was formed by mixing 65 mass % of core-sheath type fusible fibers A (fusible fibers for bulky) and 35 mass % of core-sheath type fusible fibers B (fusible fibers for bulky), and opening the fibers using a carding machine.

A mixed fiber web (mass per unit area: 50 g/m$^2$, thickness: 1 mm) was formed by mixing 60 mass % of acrylic fibers and 40 mass % of polypropylene fibers (the number of acrylic fibers:the number of polypropylene fibers=1.16:1), and opening the fibers using a carding machine. The fiber web for bulky was stacked on one side of the mixed fiber web to form a laminated sheet.
(2) Part of the acrylic fibers and the polypropylene fibers, which constituted the mixed fiber web, were penetrated into the fiber web for bulky, and entangled by the action of needles from the mixed fiber web side of the laminated sheet at a needle density of 40 needles/cm$^2$, to form a unified sheet having a fiber web layer for bulky and a mixed nonwoven fabric layer.
(2') Only the sheath components of core-sheath type fusible fibers A and B, which constituted the fiber web layer for bulky, were fused by heat-treating the unified sheet using a hot-air dryer set at a temperature of 150° C., to form a fused unified sheet having a fiber-fused nonwoven fabric layer and a mixed nonwoven fabric layer.
(3) The fused unified sheet was washed for 6 seconds with hot water at a temperature of 70° C., and naturally dried to form a washed sheet, from which an oil agent was removed.
(4) While being conveyed, the washed sheet was passed between smooth rubber rollers with a gauge of 0 to deform it in the thickness direction, and as a result, the mixed nonwoven fabric layer was charged by friction, to form a filtration material (mass per unit area: 150 g/m$^2$, thickness: 3 mm) having a fiber-fused nonwoven fabric layer (a bulky fiber sheet layer) and a triboelectrically-charged nonwoven fabric layer. In the filtration material, the constituent fibers of the triboelectrically-charged nonwoven fabric layer were penetrated into the fiber-fused nonwoven fabric layer. The physical properties of the filtration material are shown in Table 1.

Example 2

(1) The procedures of Example 1 were repeated, except that 65 mass % of core-sheath type fusible fibers C (fusible fibers for bulky) and 35 mass % of core-sheath type fusible fibers D (fusible fibers for bulky) were mixed, and opened using a carding machine to form a fiber web for bulky (mass per unit area: 100 g/m$^2$, thickness: 2.0 mm), to form a filtration material (mass per unit area: 150 g/m$^2$, thickness: 3 mm) having a fiber-fused nonwoven fabric layer (a bulky fiber sheet layer) and a triboelectrically-charged nonwoven fabric layer. In the filtration material, the constituent fibers of the triboelectrically-charged nonwoven fabric layer were penetrated into the fiber-fused nonwoven fabric layer. The physical properties of the filtration material are shown in Table 1.

Example 3

(1) The procedures of Example 1 were repeated, except that a fiber web for bulky (thickness: 3 mm) having a mass per unit area of 150 g/m$^2$ was formed, to form a filtration material (mass per unit area: 200 g/m$^2$, thickness: 4 mm) having a fiber-fused nonwoven fabric layer (a bulky fiber sheet layer) and a triboelectrically-charged nonwoven fabric layer. In the filtration material, the constituent fibers of the triboelectrically-charged nonwoven fabric layer were penetrated into the fiber-fused nonwoven fabric layer. The physical properties of the filtration material are shown in Table 1.

Example 4

(1) The procedures of Example 1 were repeated, except that a fiber web for bulky (thickness: 1 mm) having a mass per unit area of 50 g/m$^2$ was formed, to form a filtration material (mass per unit area: 100 g/m$^2$, thickness: 2 mm) having a fiber-fused nonwoven fabric layer (a bulky fiber sheet layer) and a triboelectrically-charged nonwoven fabric layer. In the filtration material, the constituent fibers of the triboelectrically-charged nonwoven fabric layer were penetrated into the fiber-fused nonwoven fabric layer. The physical properties of the filtration material are shown in Table 1.

Example 5

(1) The procedures of Example 1 were repeated, to form a fiber web for bulky (mass per unit area: 100 g/m$^2$, thickness: 2 mm).

A mixed fiber web (mass per unit area: 50 g/m$^2$, thickness: 1 mm) was formed by mixing 45 mass % of acrylic fibers, 30 mass % of polypropylene fibers, and 25 mass % of core-sheath type fusible fibers B (fusible fibers for a charged layer)(the number of acrylic fibers:the number of polypropylene fibers=1.16:1), and opening the fibers using a carding machine. The fiber web for bulky was stacked on one side of the mixed fiber web to form a laminated sheet.

(2) Part of the acrylic fibers, the polypropylene fibers, and core-sheath type fusible fibers B, which constituted the mixed fiber web, were penetrated into the fiber web for bulky, and entangled by the action of needles from the mixed fiber web side of the laminated sheet at a needle density of 40 needles/cm², to form a unified sheet having a fiber web layer for bulky and a mixed nonwoven fabric layer.

(2') Only the sheath components of core-sheath type fusible fibers A and B, which constituted the fiber web layer for bulky, as well as the sheath component of core-sheath type fusible fibers B, which constituted the mixed nonwoven fabric layer, were fused by heat-treating the unified sheet using a hot-air dryer set at a temperature of 150° C., to form a fused unified sheet having a fiber-fused nonwoven fabric layer and a mixed nonwoven fabric layer.

(3) The fused unified sheet was washed for 3 seconds with hot water at a temperature of 70° C., to form a washed sheet, from which an oil agent was removed.

(4) While being conveyed, the washed sheet was passed between smooth rubber rollers with a gauge of 0 to deform it in the thickness direction, and as a result, the mixed nonwoven fabric layer was charged by friction, to form a filtration material (mass per unit area: 150 g/m², thickness: 3 mm) having a fiber-fused nonwoven fabric layer (a bulky fiber sheet layer) and a triboelectrically-charged nonwoven fabric layer. In the filtration material, the constituent fibers of the triboelectrically-charged nonwoven fabric layer were penetrated into the fiber-fused nonwoven fabric layer. The physical properties of the filtration material are shown in Table 1.

Example 6

The procedures of Example 5 were repeated, except that a mixed fiber web prepared by mixing 30 mass % of acrylic fibers, 20 mass % of polypropylene fibers, and 50 mass % of core-sheath type fusible fibers B (fusible fibers for a charged layer)(the number of acrylic fibers:the number of polypropylene fibers=1.16:1) was used, to form a filtration material (mass per unit area: 150 g/m², thickness: 3 mm) having a fiber-fused nonwoven fabric layer (a bulky fiber sheet layer) and a triboelectrically-charged nonwoven fabric layer. In the filtration material, the constituent fibers of the triboelectrically-charged nonwoven fabric layer were penetrated into the fiber-fused nonwoven fabric layer. The physical properties of the filtration material are shown in Table 1.

Comparative Example 1

(1) The procedures of Example 1 were repeated, to form a mixed fiber web (mass per unit area: 50 g/m², thickness: 1 mm). The spunbond nonwoven fabric was stacked on one side of the mixed fiber web to form a laminated sheet.

(2) Part of the acrylic fibers and the polypropylene fibers, which constituted the mixed fiber web, were penetrated into the spunbond nonwoven fabric, and entangled by the action of needles from the mixed fiber web side of the laminated sheet at a needle density of 40 needles/cm², to form a unified sheet having a spunbond nonwoven fabric layer and a mixed nonwoven fabric layer.

(3) The unified sheet was washed for 3 seconds with hot water at a temperature of 70° C., to form a washed sheet, from which an oil agent was removed.

(4) While being conveyed, the washed sheet was passed between smooth rubber rollers with a gauge of 0 to deform it in the thickness direction, and as a result, the mixed nonwoven fabric layer was charged by friction, to form a filtration material (mass per unit area: 70 g/m², thickness: 1 mm) having a spunbond nonwoven fabric layer and a triboelectrically-charged nonwoven fabric layer. In the filtration material, the constituent fibers of the triboelectrically-charged nonwoven fabric layer were penetrated into the spunbond nonwoven fabric layer. The physical properties of the filtration material are shown in Table 1.

Comparative Example 2

(2) The procedures of Example 5 were repeated; except that the laminated sheet, which was simply laminated without the action of needles from the mixed fiber web side of the laminated sheet, was heat-treated using a hot-air dryer set at a temperature of 150° C., to fuse only the sheath components of core-sheath type fusible fibers A and B (fusible fibers for bulky), which constituted the fiber web layer for bulky, as well as the sheath component of core-sheath type fusible fibers B (fusible fibers for a charged layer), which constituted the mixed nonwoven fabric layer, to form a fused unified sheet having a fiber-fused nonwoven fabric layer and a mixed nonwoven fabric layer, in which both layers were also bonded to each other by fusion; to form a filtration material (mass per unit area: 150 g/m², thickness: 3 mm) having a fiber-fused nonwoven fabric layer (a bulky fiber sheet layer) and a triboelectrically-charged nonwoven fabric layer. In the filtration material, the constituent fibers of the triboelectrically-charged nonwoven fabric layer were not penetrated into the fiber-fused nonwoven fabric layer. The physical properties of the filtration material are shown in Table 1.

(Evaluation of Filtration Material)

(1) Measurement of Filtering Efficiency

After a plate-shaped filtration material was set in a holder having an effective frontage area of 0.04 m², atmospheric dust having a particle size of 0.3 to 0.5 μm (number of atmospheric dust: U) was supplied to the upstream side of the filtration material. Under the conditions where air was passed at a face wind velocity of 10 cm/sec., the number (D) of atmospheric dust at the downstream side was measured using a particle counter (manufactured by RION Co., Ltd.: Type KC-01C), and the value calculated from the following equation was regarded as filtering efficiency. The results are shown in Table 1.

Filtering efficiency (%)=[1−(D/U)]×100

(2) Measurement of Rigidity

The rigidity was measured in accordance with a Gurley method as defined in JIS L 1913:2010, 6.7.4. Each test piece was cut into a rectangle having a size of 30 mm×40 mm. The side of 30 mm was fixed to a chuck so that pendulum B was brought into contact with the triboelectrically-charged nonwoven fabric layer side, and the measurement was carried out. The results are shown in Table 1.

(3) Evaluation of Fuzzing

In accordance with a drying test of JIS L 0849:2013, 9.2 [Rubbing tester type II (Gakushin type) method], the central part (distance: 100 mm) of each sample was rubbed ten times at a reciprocating speed of 30 stroke per minute. After that, the degree of fuzzing was visually evaluated in accordance with the following criteria. The results are shown in Table 1.

(Evaluation criteria)

○: Fuzzed fibers hardly occurred, and fluffs entangled with fuzzed fibers were not generated.

Δ: Fuzzed fibers, which detached from the sample when pulled, occurred, and fluffs entangled with fuzzed fibers were slightly generated.

×: Fuzzed fibers, which easily detached from the sample when pulled, occurred, and many fluffs entangled with fuzzed fibers were generated.

TABLE 1

| | Bulky fiber sheet layer | | | Triboelectrically-charged nonwoven fabric layer | | | | Filtration material | | | | |
|---|---|---|---|---|---|---|---|---|---|---|---|---|
| | (a) g/m² | (b) mm | (c) g/cm³ | (a) g/m² | (b) mm | (c) g/cm³ | (d) | (a) g/m² | (b) mm | (e) % | (f) mN/30 mm | (g) |
| Ex. 1 | 100 | 2 | 0.05 | 50 | 1 | 0.05 | p. | 150 | 3 | 70 | 4.7 | Δ |
| Ex. 2 | 100 | 2 | 0.05 | 50 | 1 | 0.05 | p. | 150 | 3 | 69 | 4.4 | Δ |
| Ex. 3 | 150 | 3 | 0.075 | 50 | 1 | 0.05 | p. | 200 | 4 | 74 | 7.0 | Δ |
| Ex. 4 | 50 | 1 | 0.05 | 50 | 1 | 0.05 | p. | 100 | 2 | 53 | 2.3 | Δ |
| Ex. 5 | 100 | 2 | 0.05 | 50 | 1 | 0.05 | p. | 150 | 3 | 60 | 4.9 | ○ |
| Ex. 6 | 100 | 2 | 0.05 | 50 | 1 | 0.05 | p. | 150 | 3 | 49 | 5.2 | ○ |
| Comp. Ex. 1 | 20 | 0.14 | 0.14 | 50 | 1 | 0.05 | p. | 70 | 1 | 37 | 0.5 | Δ |
| Comp. Ex. 2 | 100 | 2 | 0.05 | 50 | 1 | 0.05 | n.p. | 150 | 3 | 35 | 5.1 | ○ |

(a) Mass per unit area
(b) Thickness
(c) Apparent density
(d) Penetration p.: Penetrated n.p.: Not penetrated
(e) Filtering efficiency
(f) Rigidity
(g) Fuzzing It was found, from the comparison of Example 4 with Comparative Example 1, that when the thickness of the bulky fiber sheet layer was 0.5 mm or more, the filtering efficiency was high. It was considered that this was because the bulky fiber sheet layer was easily deformed, and as a result, the amount of electrical charge of the triboelectrically-charged nonwoven fabric layer became large. Further, when the thickness of the bulky fiber sheet layer was 0.5 mm or more, it had a high rigidity and a good processability.

It was found, from the comparison of Example 5 with Comparative Example 2, that when the fibers that constitute the triboelectrically-charged nonwoven fabric layer penetrated into the bulky fiber sheet layer, the filtering efficiency was high. It was considered that this was because the fibers that constitute the triboelectrically-charged nonwoven fabric layer penetrated into the bulky fiber sheet layer, and therefore, the penetrating fibers rubbed each other easily, and as a result, the amount of electrical charge of the triboelectrically-charged nonwoven fabric layer became large.

It was found, from the comparison of Example 5 with Example 6, that, as the fibers that constitute the triboelectrically-charged nonwoven fabric layer, a filtration material in which the total amount of fibers contributing to triboelectric charging (polypropylene fibers and acrylic fibers in Examples 5 and 6) was high, or the ratio of fibers contributing to triboelectric charging was high, had a good filtration efficiency. It was considered that this was because triboelectric charging easily occurred.

Example 7

(1) A mixed fiber web (mass per unit area: 50 g/m²) was formed by mixing 60 mass % of acrylic fibers and 40 mass % of polypropylene fibers (the number of acrylic fibers:the number of polypropylene fibers=1.16:1), and opening the fibers using a carding machine.
(2) Fiber web for bulky A (mass per unit area: 50 g/m²) and fiber web for bulky B (mass per unit area: 50 g/m²) were formed by mixing 65 mass % of core-sheath type fusible fibers A (fusible fibers for bulky) and 35 mass % of core-sheath type fusible fibers B (fusible fibers for bulky), and opening the fibers using a carding machine.
(3) The mixed fiber web was sandwiched between fiber web for bulky A and fiber web for bulky B to form a three-layer sheet.
(4) Part of the acrylic fibers and the polypropylene fibers, which constituted the mixed fiber web, were penetrated into fiber web for bulky A, and entangled by the action of needles from the fiber web for bulky B side of the three-layer sheet at a needle density of 40 needles/cm², to form a unified three-layer sheet having a mixed nonwoven fabric layer between fiber web layer for bulky A and fiber web layer for bulky B. In connection with this, part of the constituent fibers of fiber web for bulky B was penetrated into the mixed nonwoven fabric layer, and entangled.
(4') Only the sheath components of core-sheath type fusible fibers A and B, which constituted fiber web layers for bulky A and B on both surfaces, were fused by passing hot air through from the top of the unified three-layer sheet, using a hot-air dryer set at a temperature of 150° C., and the unified three-layer sheet was passed between hot rollers (gauge: 3 mm) to form a fused unified three-layer sheet (thickness: 3 mm) having a mixed nonwoven fabric layer between fiber-fused nonwoven fabric layers (bulky fiber sheet layers A and B).
(5) The fused unified three-layer sheet was washed for 6 seconds with hot water at a temperature of 70° C., and naturally dried to form a washed three-layer sheet, from which an oil agent was removed.
(6) While being conveyed, the washed three-layer sheet was passed between smooth rubber rollers with a gauge of 0 to deform it in the thickness direction, and as a result, the mixed nonwoven fabric layer was charged by friction, to form a three-layer filtration material (mass per unit area: 150 g/m², thickness: 3 mm) having a triboelectrically-charged nonwoven fabric layer between fiber-fused nonwoven fabric layers (bulky fiber sheet layers A and B). In the filtration material, the constituent fibers of the triboelectrically-charged nonwoven fabric layer were penetrated into bulky fiber sheet layer A. The physical properties of the three-layer filtration material are shown in Table 2.

Example 8

The procedures of Example 7 were repeated, except that a fiber web (mass per unit area: 50 g/m²) prepared by mixing 85 mass % of core-sheath type fusible fibers C and 15 mass % of core-sheath type fusible fibers D and opening the fibers using a carding machine was used as fiber webs for bulky A and B, to form a three-layer filtration material (mass per unit area: 150 g/m², thickness: 3 mm) having a triboelectrically-charged nonwoven fabric layer between fiber-fused nonwoven fabric layers (bulky fiber sheet layers A and B). In the three-layer filtration material, the constituent fibers of the triboelectrically-charged nonwoven fabric layer were penetrated into bulky fiber sheet layer A. The physical properties of the three-layer filtration material are shown in Table 2.

Example 9

The procedures of Example 7 were repeated, except that a fiber web (mass per unit area: 30 g/m²) prepared by mixing 65 mass % of core-sheath type fusible fibers A and 35 mass % of core-sheath type fusible fibers B and opening the fibers using a carding machine was used as fiber webs for bulky A and B, to form a three-layer filtration material (mass per unit area: 110 g/m², thickness: 2.4 mm) having a triboelectrically-charged nonwoven fabric layer between fiber-fused nonwoven fabric layers (bulky fiber sheet layers A and B). In the three-layer filtration material, the constituent fibers of the triboelectrically-charged nonwoven fabric layer were penetrated into bulky fiber sheet layer A. The physical properties of the three-layer filtration material are shown in Table 2.

Comparative Example 3

(1) A mixed fiber web (mass per unit area: 50 g/m²) was formed by mixing 60 mass % of acrylic fibers and 40 mass % of polypropylene fibers (the number of acrylic fibers:the number of polypropylene fibers=1.16:1), and opening the fibers using a carding machine.
(2) Fiber web for bulky A (mass per unit area: 100 g/m²) was formed by mixing 65 mass % of core-sheath type fusible fibers A (fusible fibers for bulky) and 35 mass % of core-sheath type fusible fibers B (fusible fibers for bulky), and opening the fibers using a carding machine.
(3) The mixed fiber web and fiber web for bulky A were laminated to form a two-layer sheet.
(4) Part of the acrylic fibers and the polypropylene fibers, which constituted the mixed fiber web, were penetrated into fiber web for bulky A, and entangled by the action of needles from the mixed fiber web side of the two-layer sheet to the fiber web for bulky A side at a needle density of 40 needles/cm², to form a unified two-layer sheet having fiber web layer for bulky A and a mixed nonwoven fabric layer.
(4') Only the sheath components of core-sheath type fusible fibers A and B, which constituted fiber web layer for bulky A, were fused by passing hot air through from the top of the unified two-layer sheet, using a hot-air dryer set at a temperature of 150° C., and the unified two-layer sheet was passed between hot rollers (gauge: 3 mm) to form a fused unified two-layer sheet (thickness: 3 mm) having a fiber-fused nonwoven fabric layer (bulky fiber sheet layer A) and a mixed nonwoven fabric layer.
(5) The fused unified two-layer sheet was washed for 6 seconds with hot water at a temperature of 70° C., and naturally dried to form a washed two-layer sheet, from which an oil agent was removed.
(6) While being conveyed, the washed two-layer sheet was passed between smooth rubber rollers with a gauge of 0 to deform it in the thickness direction, and as a result, the mixed nonwoven fabric layer was charged by friction, to form a two-layer filtration material (mass per unit area: 150 g/m², thickness: 3 mm) having a fiber-fused nonwoven fabric layer (bulky fiber sheet layer A) and a triboelectrically-charged nonwoven fabric layer. In the two-layer filtration material, the constituent fibers of the triboelectrically-charged nonwoven fabric layer were penetrated into bulky fiber sheet layer A. The physical properties of the two-layer filtration material are shown in Table 2.

Comparative Example 4

The procedures of Example 7 were repeated, except that a fiber web (mass per unit area: 20 g/m²) prepared by mixing 65 mass % of core-sheath type fusible fibers A and 35 mass % of core-sheath type fusible fibers B and opening the fibers using a carding machine was used as fiber webs for bulky A and B, to form a three-layer filtration material (mass per unit area: 90 g/m², thickness: 2.2 mm) having a triboelectrically-charged nonwoven fabric layer between fiber-fused nonwoven fabric layers (bulky fiber sheet layers A and B). In the three-layer filtration material, the constituent fibers of the triboelectrically-charged nonwoven fabric layer were penetrated into bulky fiber sheet layer A. The physical properties of the three-layer filtration material are shown in Table 2.

Comparative Example 5

The procedures of Example 7 were repeated, except that the spunbond nonwoven fabric (mass per unit area: 20 g/m², thickness: 0.14 mm) was used instead of fiber webs for bulky A and B, to form a three-layer filtration material (mass per unit area: 90 g/m², thickness: 1.28 mm) having a triboelectrically-charged nonwoven fabric layer between the spunbond nonwoven fabric. In the three-layer filtration material, the constituent fibers of the triboelectrically-charged nonwoven fabric layer were penetrated into one of the spunbond nonwoven fabric layers. The physical properties of the three-layer filtration material are shown in Table 2.

Comparative Example 6

The procedures of Example 7 were repeated, except that the three-layer sheet was not treated with the action of needles so that the acrylic fibers and polypropylene fibers, which constitute the mixed fiber web, were not penetrated into either fiber web for bulky A or fiber web for bulky B, to form a three-layer filtration material (mass per unit area: 150 g/m², thickness: 3 mm) having a triboelectrically-charged nonwoven fabric layer between fiber-fused nonwoven fabric layers (bulky fiber sheet layers A and B). The physical properties of the three-layer filtration material are shown in Table 2.

Comparative Example 7

The procedures of Example 7 were repeated, except that a fiber web (mass per unit area: 50 g/m²) prepared by opening 100% of acrylic fibers using a carding machine was used as fiber webs for bulky A and B, to form a three-layer filtration material (mass per unit area: 150 g/m², thickness: 3 mm) having a triboelectrically-charged nonwoven fabric layer between acrylic fiber nonwoven fabric layers (bulky fiber sheet layers A and B). In the three-layer filtration material, the constituent fibers of the triboelectrically-charged nonwoven fabric layer were penetrated into the acrylic fiber nonwoven fabric layer. The physical properties of the three-layer filtration material are shown in Table 2.

(Evaluation of Three-Layer Filtration Material)
(1) Measurement of Filtering Efficiency After a plate-shaped three-layer filtration material was set in a holder having an effective frontage area of 0.04 m² so that the bulky fiber sheet layer A side was at the upstream side, atmospheric dust having a particle size of 0.3 to 0.5 μm (number of atmospheric dust: U) was supplied to the upstream side of the three-layer filtration material. Under the conditions where air was passed at a face wind velocity of 10 cm/sec., the number (D) of atmospheric dust at the downstream side was measured using a particle counter (manufactured by RION Co., Ltd.: Type KC-01C), and the value calculated from the following equation was regarded as filtering efficiency. The results are shown in Table 2.

Filtering efficiency (%)=[1−(D/U)]×100

(2) Measurement of Rigidity

The rigidity of each three-layer filtration material or each two-layer filtration material was measured in accordance with a Gurley method as defined in JIS L 1913:2010, 6.7.4. Each test piece was cut into a rectangle having a size of 30 mm×40 mm. The side of 30 mm was fixed to a chuck so that the bulky nonwoven fabric layer A was brought into contact with pendulum B, and the measurement was carried out. The results are shown in Table 2.

(3) Evaluation of Flame-Resistance flame-resistance was evaluated in accordance with a method defined in JACA N0.11A-2003 "Standard of test method for combustion of air filter media". The case where the sample did not flame, or even if it flamed, the combustion distance was 35 mm or less was evaluated as "○". The case where the sample flamed, and the combustion distance was more than 35 mm was evaluated as "x". Each test piece was cut into a rectangle having a size of 150 mm×50 mm. The sample was set so that the bulky fiber sheet layer A side was exposed to fire, and the measurement was carried out. The results are shown in Table 2.

The following was found from the results as shown in Table 2.

(1) It was found, from the comparison of Example 9 with Comparative Example 4, that when the bulky fiber sheet layer had a mass per unit area 0.5 times or more than that of the triboelectrically-charged nonwoven fabric layer, it had a good flame-resistance.

(2) It was found, from the comparison of Example 7 with Comparative Example 3, that when the bulky fiber sheet layers were located on both sides of the triboelectrically-charged nonwoven fabric layer, it had a good flame-resistance.

(3) It was found, from the comparison of Example 9 with Comparative Example 5, that when the thickness of the bulky fiber sheet layer is 0.5 mm or more, it had a good filtering efficiency.

(4) It was found, from the comparison of Example 7 with Comparative Example 6, that when the fibers that constituted the triboelectrically-charged nonwoven fabric layer penetrated into the bulky fiber sheet layer, it had a good filtering efficiency.

(5) It was found, from the comparison of Example 7 with Comparative Example 7, that when fibers having a limiting oxygen index of 20 or more were contained, as the fibers that constituted the bulky fiber sheet layer, it had a good flame-resistance.

INDUSTRIAL APPLICABILITY

Since the filtration material of the present invention has a high rigidity, and a decline in filtering efficiency is unlikely to occur, it may be suitably used as a filtration material for a filter element by pleating. The filter element using the filtration material of the present invention may be suitably used, for example, as an air filter, in particular, an interior air filter for automobiles.

Since the three-layer filtration material of the present invention has a high rigidity, and a decline in filtering efficiency is unlikely to occur, and further, it has a good flame-resistance, and therefore, it may be suitably used as a three-layer filtration material for a pleated filter element requiring flame-resistance. The filter element prepared by pleating the three-layer filtration material of the present

TABLE 2

| | Bulky fiber sheet layer A | | | Triboelectrically-charged nonwoven fabric layer | | | | Bulky fiber sheet layer B | | | Three-layer filtration material | | | | |
|---|---|---|---|---|---|---|---|---|---|---|---|---|---|---|---|
| | (a) g/m² | (b) mm | (c) g/cm³ | (a) g/m² | (b) mm | (c) g/cm³ | (d) | (a) g/m² | (b) mm | (c) g/cm³ | (a) g/m² | (b) mm | (e) % | (f) mN/30 mm | (h) |
| Ex. 7 | 50 | 1 | 0.05 | 50 | 1 | 0.05 | p. | 50 | 1 | 0.05 | 150 | 3 | 71 | 3.1 | ○ |
| Ex. 8 | 50 | 1 | 0.05 | 50 | 1 | 0.05 | p. | 50 | 1 | 0.05 | 150 | 3 | 69 | 3.2 | ○ |
| Ex. 9 | 30 | 0.7 | 0.04 | 50 | 1 | 0.05 | p. | 30 | 0.7 | 0.04 | 110 | 2.4 | 74 | 2.6 | ○ |
| Comp. Ex. 3 | 100 | 2 | 0.05 | 50 | 1 | 0.05 | p. | — | — | — | 150 | 3 | 73 | 3.3 | X |
| Comp. Ex. 4 | 20 | 0.6 | 0.03 | 50 | 1 | 0.05 | p. | 20 | 0.6 | 0.03 | 90 | 2.2 | 65 | 2.6 | X |
| Comp. Ex. 5 | 20 | 0.14 | 0.14 | 50 | 1 | 0.05 | p. | 20 | 0.14 | 0.14 | 90 | 1.28 | 41 | 0.4 | X |
| Comp. Ex. 6 | 50 | 1 | 0.05 | 50 | 1 | 0.05 | n.p. | 50 | 1 | 0.05 | 150 | 3 | 40 | 2.7 | ○ |
| Comp. Ex. 7 | 50 | 1 | 0.05 | 50 | 1 | 0.05 | p. | 50 | 1 | 0.05 | 150 | 3 | 72 | 0.6 | X |

(a) Mass per unit area
(b) Thickness
(c) Apparent density
(d) Penetration p.: Penetrated n.p.: Not penetrated
(e) Filtering efficiency
(f) Rigidity
(h) Flame-retardancy

REFERENCE SIGNS LIST

R₁ to R₃: Roller
P₁ and P₂: Plate
S: Washed sheet

The invention claimed is:

1. A three-layer filtration material comprising two bulky fiber sheet layers made of a fiber-fused nonwoven fabric having a thickness of 0.5 mm or more, said bulky fiber sheet layers comprising fibers having a fineness of 15 dtex or of a larger dtex, and a triboelectrically-charged nonwoven fabric layer in which two or more types of fibers different in constituent resin are mixed, wherein the three-layer filtration material has a structure in which the triboelectrically-charged nonwoven fabric layer is located between the bulky fiber sheet layers, and constituent fibers of the triboelectrically-charged nonwoven fabric layer penetrate into the bulky fiber sheet layers.

2. The three-layer filtration material according to claim 1, comprising fusible fibers, as constituent fibers of the triboelectrically-charged nonwoven fabric layer, wherein the fusible fibers are fused.

3. A filter element comprising the three-layer filtration material of claim 1 in a pleated state.

4. A method of manufacturing the three-layer filtration material of claim 1, said method comprising the steps of:
  (1) providing a mixed fiber web in which two or more types of fibers different in constituent resin are mixed,
  (2) providing two bulky fiber sheets containing fibers having a fineness of 15 dtex or of a larger dtex, said bulky fiber sheets having a thickness of 0.5 mm or more and containing fusible fibers,
  (3) sandwiching the mixed fiber web between the bulky fiber sheets to form a three-layer sheet,
  (4) penetrating constituent fibers of the mixed fiber web into the bulky fiber sheets, to form a unified three-layer sheet in which a mixed nonwoven fabric layer is located between bulky fiber sheet layers,
  (5) washing the unified three-layer sheet to form a washed three-layer sheet from which an oil agent is removed, and
  (6) deforming the washed three-layer sheet in the thickness direction, and charging the mixed nonwoven fabric layer by friction, to form the three-layer filtration material in which a triboelectrically-charged nonwoven fabric layer is located between the bulky fiber sheet layers.

5. The method according to claim 4, wherein the bulky fiber sheets are fiber webs containing fusible fibers, and after the formation of the unified sheet and before the charging of the mixed nonwoven fabric layer by friction, the fusible fibers are fused to form the bulky fiber sheet layers made of a fiber-fused nonwoven fabric.

6. The method according to claim 4, wherein the constituent fibers of the fiber web are penetrated into the bulky fiber sheets by the action of needles from a fiber web side of the laminated sheet.

7. The method according to claim 4, wherein the washed sheet is passed through a gap narrower than the thickness of the washed sheet, to deform the washed sheet in the thickness direction.

8. The three-layer filtration material according to claim 1, wherein the triboelectrically-charged nonwoven fabric layer in which two or more types of fibers different in constituent resin are mixed is located between the bulky fiber sheet layers having a thickness of 0.5 mm or more, wherein the constituent fibers of the triboelectrically-charged nonwoven fabric layer penetrate into the bulky fiber sheet layers, and both bulky fiber sheet layers contain fibers having a limiting oxygen index of 20 or more as constituent fibers, and have a mass per unit area 0.5 times or more than that of the triboelectrically-charged nonwoven fabric layer.

9. A filter element comprising the three-layer filtration material of claim 8 in a pleated state.

10. A method of manufacturing a three-layer filtration material, said method comprising the steps of:
  (1) providing a mixed fiber web in which two or more types of fibers different in constituent resin are mixed,
  (2) providing two bulky fiber sheets containing fibers having a limiting oxygen index of 20 or more and a fineness of 15 dtex or of a larger dtex, said bulky fiber sheets having a thickness of 0.5 mm or more, and a mass per unit area 0.5 times or more than that of the mixed fiber web,
  (3) sandwiching the mixed fiber web between the bulky fiber sheets to form a three-layer sheet,
  (4) penetrating constituent fibers of the mixed fiber web into the bulky fiber sheets, to form a unified three-layer sheet in which a mixed nonwoven fabric layer is located between bulky fiber sheet layers,
  (5) washing the unified three-layer sheet to form a washed three-layer sheet from which an oil agent is removed, and
  (6) deforming the washed three-layer sheet in the thickness direction, and charging the mixed nonwoven fabric layer by friction, to form the three-layer filtration material in which a triboelectrically-charged nonwoven fabric layer is located between the bulky fiber sheet layers.

* * * * *